US008100020B2

(12) United States Patent
Kinlen et al.

(10) Patent No.: US 8,100,020 B2
(45) Date of Patent: Jan. 24, 2012

(54) COMPLIANT AND WIRELESS HEALTH MONITORING SENSORS FOR COMPOSITE STRUCTURES

(75) Inventors: Patrick J. Kinlen, Fenton, MO (US); Huaxiang Yang, Hattiesburg, MS (US); Dongsik Kim, Purvis, MS (US); Abhishek K. Singh, Hattiesburg, MS (US); Brady Pitts, Hattiesburg, MS (US)

(73) Assignee: Lumimove, Inc., a Missouri Corporation, St. Louis, MO (US)

( * ) Notice: Subject to any disclaimer, the term of this patent is extended or adjusted under 35 U.S.C. 154(b) by 132 days.

(21) Appl. No.: 12/486,549

(22) Filed: Jun. 17, 2009

(65) Prior Publication Data

US 2010/0095781 A1    Apr. 22, 2010

Related U.S. Application Data

(60) Provisional application No. 61/132,263, filed on Jun. 17, 2008.

(51) Int. Cl.
*G01B 7/16* (2006.01)
(52) U.S. Cl. .......................................... 73/777; 73/760
(58) Field of Classification Search ............. 73/760–860
See application file for complete search history.

(56) References Cited

U.S. PATENT DOCUMENTS

| | | | |
|---|---|---|---|
| 5,382,486 A * | 1/1995 | Yu et al. ........................... | 430/56 |
| 5,505,093 A | 4/1996 | Giedd et al. | |
| 5,633,465 A | 5/1997 | Kaufmann et al. | |
| 7,899,552 B2 * | 3/2011 | Atanasoska et al. ........... | 607/122 |
| 2002/0177039 A1 * | 11/2002 | Lu et al. ......................... | 429/213 |
| 2006/0203882 A1 * | 9/2006 | Makela et al. ................. | 374/161 |
| 2008/0118752 A1 * | 5/2008 | Inoue et al. .................... | 428/354 |
| 2008/0237659 A1 * | 10/2008 | Yang ............................... | 257/288 |
| 2008/0266930 A1 * | 10/2008 | Auciello ........................ | 365/145 |

OTHER PUBLICATIONS

Patent Cooperation Treaty, PCT International Search Report and Written Opinion of the International Searching Authority (ISA/EPO), mailed Dec. 28, 2009, Completion of international search Aug. 25, 2009, International Application No. PCT/US2009/047696, International Filing Date: Jun, 17, 2009, Lumimove, Inc., D/B/A Crosslink.
PCT Partial International Search, mailed Sep. 3, 2009, International Application No. PCT/US2009/047696, International Filing Date Jun. 17, 2009, Lumimove, Inc., d/b/a Crosslink.
The International Bureau of WIPO, Advance E-Mail PCT Notification Concerning Transmittal of International Preliminary Report on Patentability (PCT/IB/326), mailed Dec. 29, 2010, PCT International Preliminary Report on Patentability, issued Dec. 18, 2010, International Application No. PCT/US2009/047696, International Filing Date Jun. 17, 2009, Lumimove, Inc. D/B/A Crosslink et al.
J.R. Reynolds, et al., Iron (III) Perchlorate Doping of Polyacetylene, Journal De Physique, Colloque C3, supplement au no6, Tome 44, juin 1983, pp. C3-171-C3-174.
Y.W. Park, et al., Metallic temperature dependence of resistivity in perchlorate doped polyacetylene, Synthetic Metals 96 (1998) 81-86.

(Continued)

*Primary Examiner* — Max Noori
(74) *Attorney, Agent, or Firm* — Nelson Mullins Riley & Scarborough, LLP

(57) ABSTRACT

A sensor is provided. The sensor includes a substrate having at least one intrinsically conductive polymer coated on at least a first surface thereof and at least a first and second conductive contact.

20 Claims, 12 Drawing Sheets

OTHER PUBLICATIONS

David W. Hatchett, et al., Composites of Intrinsically Conducting Polymers as Sensing Nanomaterials, Chem Rev. 2008, 108, 746-769.

A. Haque, et al., Monitoring Fatigue Damage in Carbon Fiber Composites Using an Acoustic Impact Technique, Materials Eval. 1998 56(6), 765-770.

R.K. Verma, et al., Acoustic emission monitoring of damage using high amplitude gains in carbon fibre reinforced poly(ether ketone ketone) J.Mater.Sci.Lett.1994,13(6), 438-42.

M. De Freitas, et al., Numerical evaluation of failure mechanisms on composite specimens subjected to impact loading, Composites: Part B 31 (2000) 199-207.

A. Sjogren, et al., Experimental determination of elastic properties of impact damage in carbon fibre/epoxy laminates, Composites: Part A 32 (2001) 1237-1242.

Joung-Man Park, et al., Inherent sensing and interfacial evaluation of carbon nanofibert and nanotube/epoxy composites using . . . , Composites: Part B 38 (2007) 847-861.

Joung-Man Park, et al., Nondestructive sensing evaluation of surface modified single-carbon fiber reinforced epoxy composites . . . , Composites: Part B 37 (2006) 612-626.

K.S.C. Kuang, et al., Journal of Thermoplastic Composite Materials 2003; 16; 213-229, DOI: 10.1177/0892705703016003002.

Xiaojun Wang, et al., Continuous carbon fibre epoxy-matrix composite as a sensor of its own strain, Smart Mater. Struct. 5 (1996) 796-800.

R.R. Desai, et al., Indium sesquitelluride (In-sub.2-Te-sub.3) thin film strain gauge, Sensors and Actuators A 121 (2005) 405-409.

Shoukai Wang, et al, Self-sensing of flexural strain and damage in carbon fiber polymer-matrix composite by electrical resistance measurement, Carbon 44 (2006) 2739-2751.

F. Aymerich, et al., Ultrasonic evaluation of matrix damage in impacted composite laminates, Composites: Part B 31 (2000) 1-6.

C. Edwards, et al., Non-contact ultrasound studies of composite materials: new developments, Proceedings of SPIE vol. 3993 (2000), 268-275.

W. Zhang, et al., In situ health monitoring and repair in composites using carbon nanotube additives, Applied Physics Letters 91, 133102 (2007).

K. Schulte, et al., Load and Failure Analyses of CFRP Laminates by Means of Electrical Resistivity Measurements, Composites Science and Technology 36 (1989) 63-76.

Daojun Wang, et al., Through-thickness stress sensing of a carbon fiber polymer-matrix composite by electrical resistance measurement, Smart Mater.Struct. 16 (2007) 1320-1330.

Daojun Wang, et al., Sensitivity of the two-dimensional electric potential/resistance method for damage monitoring in carbon fiber . . . , J. Mater Sci (2006) 41:4839-4846.

Shoukai Wang, et al., Impact damage of carbon fiber polymer-matrix composites, studied by electrical resistance measurement, Composites: Part A 36 (2005) 1707-1715.

Siegfried Bauer, Piezo-, pyro- and Ferroelectrets: Soft Transducer Materials for Electromechanical Energy . . . , IEEE Trans. Dielectr. Electr. Insul, vol. 13, No. 5; Oct. 2006.

Siegfried Bauder, et al., Ferroelectrets: Soft Electroactive Foams for Transducers, Feb. 2004, Physics Today, 57(2), 37-43.

Michael Wegener, et al., Microstorms in Cellular Polymers: A Route to Soft Piezoelectric Transducer Materials with Engineered Macroscopic . . . ChemPhysChem 2005, 6, 1014-1025.

Web site information: http://www.doitpoms.ac.uk/tlpib/ferroelectrics/index.php First created: Aug. 2006. Last updated: Dec. 2006.

G. S. Neugschwandtner, et al., Large and broadband piezoelectricity in smart polymer-foam space-charge electrets, Applied Physics Letters, vol. 77, No. 23, Dec. 4, 2000.

Axel Mellinger, Dielectric Resonance Spectroscopy: a Versatile Tool in the Quest for Better Piezoelectric Polymers, IEEE Trans.Dielectr. Electr.Insul. Oct. 2003, 10, 5, 842-861.

X. Zhang, et al., Piezoelectric d-sub.33 coefficient of cellular polypropylene subjected to expansion by pressure treatment, Applied Physics Letters, Aug. 16, 2004 85, 7, 1226-28.

Reinhard Schwodiauer, Dynamically forced cantilever system: A piezo-polymer characterization tool with possible . . . , Rev. Sci. Instrum. 2005, 76, 043902/1-043902/4, 2005.

Dermot Diamond, et al., Wireless Sensor Networks and Chemo-/Biosensing, Chem. Rev. 2008, 108, 652-679.

R.C. Patil, et al., Piezoresistivity of conducting polyaniline/BaTiO-sub.3 composites, J. Mater. Res., vol. 16, No. 7, Jul. 2001.

Siegfried Bauer, et al., Ferroelectrets: Soft Electroactive Foams for Transducers, Physics Today, Feb. 2004, 57, 37-43.

Hsing-Lin Wang, et al., Tailoring Conducting Polymer Chemistry for the Chemical Deposition of Metal Particles and Clusters, Chem. Mater. 2007, 19, 520-525.

Alan Baker, et al., Composite Materials for Aircraft Structures, 2nd Ed., Am. Institute of Aeronautics and Astronautics, Inc., Reston, VA, 2004, Chapter 15.

Mark Lin, et al., The manufacture of composite structures with a built-in network of piezoceramics, Composites Science and Technology 62 (2002) 919-939.

\* cited by examiner

COMPLIANT AND WIRELESS HEALTH MONITORING SENSORS FOR COMPOSITE STRUCTURES

The present application claims priority to U.S. Provisional Patent Application Ser. No. 61/132,263, filed Jun. 17, 2008, incorporated herein by reference in its entirety.

This invention was made with Government support under Contract Award FA8650-09-C-5227, awarded by the Wright-Patterson Air Force Base. The Government has certain rights in the invention.

BACKGROUND OF THE INVENTION

The present invention relates to sensors for composites. More particularly, this invention relates to methods and devices for sensing and predicting strain and/or damage in composites.

New generations of structures, such as, but not limited to, bridges, buildings, vehicles, boats, turbine blades, wind turbine blades, space vehicles and aircraft, are being built with larger amounts of composites in primary structures, thus creating a need for new testing and monitoring systems to prevent failures, from minor structural failures to catastrophic failures. The use of composites creates new risks, because an unseen flaw could render a structure unsafe, and yet determining the condition within a composite is difficult for structural engineers and inspectors.

Failure mechanisms common to composites, such as micro-cracks, delamination and fiber pull-out, are different from those seen in metals typically used as structural materials. For example, a severe impact may leave a visible dent in a metal sheet, but may result in little surface damage in a composite. Despite the small amount of surface damage in the composite, the impact may have caused microcracking and backface delamination. Unless detected, such a defect may propagate when the composite is placed under load, resulting in catastrophic failure. For the incorporation of composites into large structural components, little information is available on the mechanisms of aging and property degradation that controls service life compared to metals.

Additionally, the rates and mechanisms of long term property degradation during regular service are poorly understood in composite structures. Moreover, monitoring defects and damage is difficult in thick composite laminates resulting in catastrophic failures that may occur without warning.

Structural health monitoring is a process of implementing a damage sensing strategy which is expected to prevent catastrophic failure by, partially or completely, predicting the onset of failure. Typically, damage may be referred to as an adverse change in a material's properties that can affect the current or future performance of the material. Damage eventually leads to failure of the structure, the condition when it is no longer acceptable for normal use. The need for monitoring the integrity of a structure becomes more critical for components having brittle behavior. Structural health monitoring may be used as a surveillance technique to monitor damage initiation and progression, and thus allowing for remedial action and prevention of catastrophic failures. Embedded or surface-mounted real time structural sensor systems will ultimately lead to reduced maintenance and operational costs and allow working with lower design safety tolerances. Early damage detection would prevent system downtime and associated costs.

The concept of structural health monitoring is applicable to civil, aerospace, and mechanical component industries. Monitoring a component built from an isotropic material, however, is considerably simpler than composite structures that are quasi-isotropic in nature. Furthermore, in addition to different failure mechanisms compared with metal constructions, composites may contain invisible microcracks and delaminations. Such defects propagate under load. Being a relatively new system, very limited information is available on the mechanisms of aging and property degradation in the composites, which controls the service life. The sensing technique, therefore, must be rugged and must be able to withstand severe operating conditions. These conditions include aerodynamic stresses, prolonged exposure to extreme temperatures, ultraviolet (UV) radiations and humidity. The sensor must be able to identify the repetitive changes in strain as well as sudden deformations (damage, crack, delamination).

SUMMARY OF THE INVENTION

In one aspect, the present invention is directed to a sensor. The sensor includes a substrate having at least one intrinsically conductive polymer coated on at least a first surface thereof and at least a first and second conductive contact in communication with at least one of the intrinsically conductive polymer coating or the substrate.

In another aspect, the present invention is directed to a method of fabricating a sensor. The method includes depositing on a first surface of a substrate at least one intrinsically conductive polymer and depositing on the at least one intrinsically conductive polymer a first and second contact in communication with at least one of the intrinsically conductive polymer coating or the substrate.

In another aspect, the invention is directed to a composite material comprising a sensor. The sensor includes a substrate having at least one intrinsically conductive polymer coated on at least a first surface thereof; and at least a first and second conductive contact in communication with at least one of the intrinsically conductive polymer coating or the substrate.

In yet another aspect, the invention is directed to a method of sensing damage in a composite material. The method includes incorporating a sensor into or onto the composite, the sensor including a substrate having at least one intrinsically conductive polymer coated on at least a first surface thereof; and at least a first and second conductive contact in communication with at least one of the intrinsically conductive polymer coating or the substrate. The method further includes detecting changes in the conductivity of the intrinsically conductive polymer over time and/or detecting changes in the capacitance of a capacitor that utilizes intrinsically conductive polymers as compliant electrodes applied to opposing sides of a dielectric, ferroelectric, or ferroelectret material.

These and other aspects of the invention will be understood and become apparent upon review of the specification by those having ordinary skill in the art.

DETAILED DESCRIPTION OF THE PREFERRED EMBODIMENTS

Figure 1:
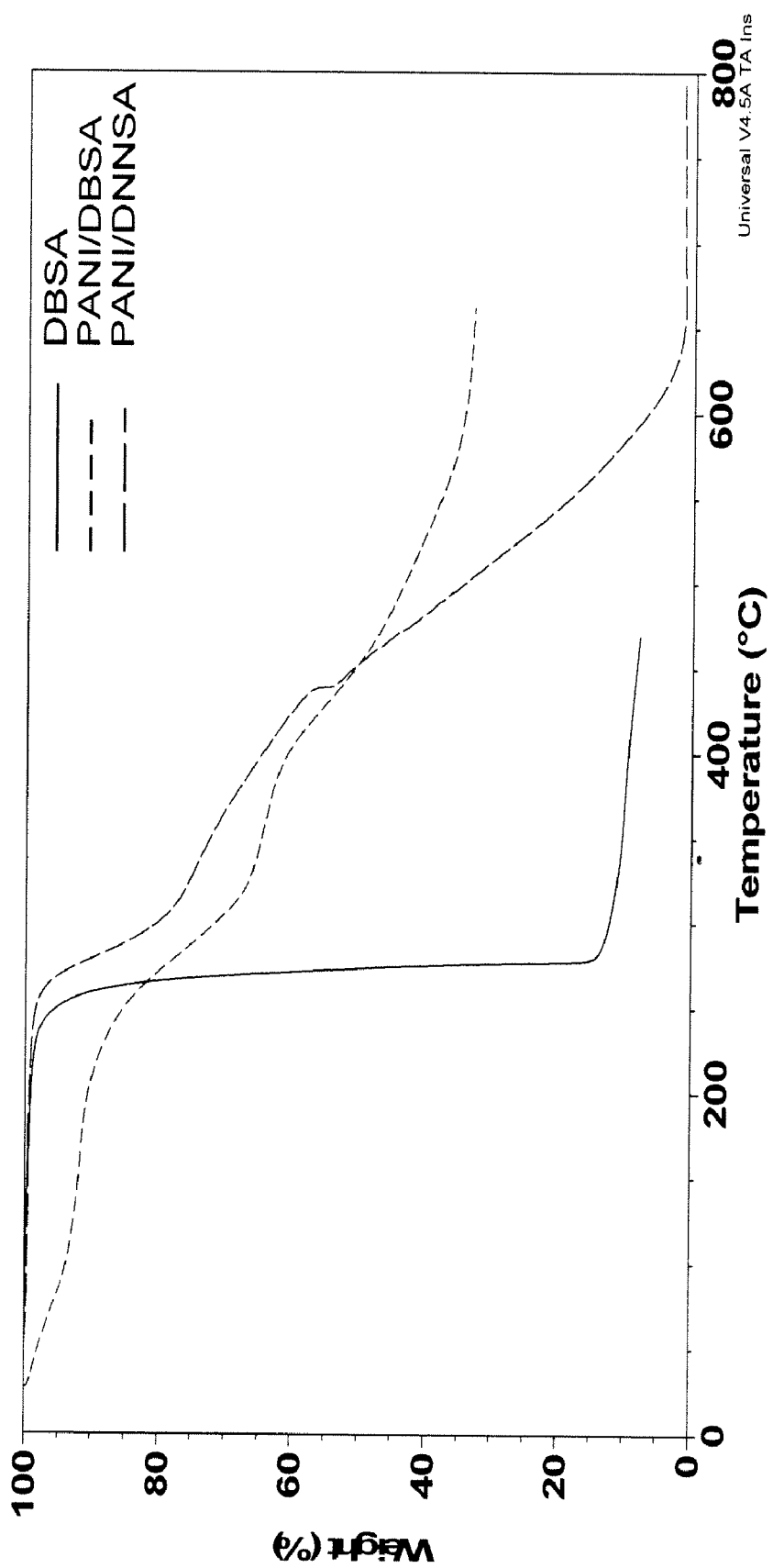
FIG. 1 is a graph showing the thermogravimetric analysis of an exemplary PANI/DBSA sample prepared in accordance with the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in or are obvious from the following detailed description. It is to be understood by one of ordinary skill in the art that the present discussion is a description of exemplary embodiments only, and is not intended as limiting the broader aspects of the present invention.

In one aspect, the present invention is directed to a sensor. The sensor may be a strain gauge sensor, a damage sensor, or both. As used herein, a strain gauge sensor detects reversible strain. Additionally, and as used herein, a damage sensor detects non-reversible damage. In some embodiments, the present sensor may sense, and distinguish between, both reversible strain and non-reversible damage. To sense strain (or stress) in a structure may be helpful for structural vibration control, load monitoring, and recording load history. To sense damage in a structure may be helpful for structural health monitoring, timely repair, and safety enhancement. The ability to sense both strain and damage may be more valuable than that of only one. Typical sensors known in the art prior to the present invention only detect strain or damage, but not both. In some embodiments, the present sensors may be utilized to detect both strain and damage.

As used herein, the term "sensor" means a device which gives a signal in response to a stimulus. Strain sensors give an output (or signal) in response to strain. Damage sensors give an output (or signal) in response to damage.

The sensor includes a substrate having at least one intrinsically conductive polymer coated on at least a first surface thereof and at least a first and second conductive contact. In some embodiments, each of the first and second conductive contacts are adjacent a surface of the at least one intrinsically conductive polymer that is not adjacent the first surface of the substrate. In other embodiments, each of the first and second conductive contacts are adjacent a surface of the at least one intrinsically conductive polymer that is adjacent the first surface of the substrate. Stated differently, in these embodiments, the first and second conductive contacts may be between the substrate and the intrinsically conductive polymer. In yet other embodiments, one of the first and second contacts may be between the substrate and the intrinsically conductive polymer, while the other of the first and second contacts is adjacent a surface of the at least one intrinsically conductive polymer that is not adjacent the first surface of the substrate. In still other embodiments, each of the first and second contacts may be adjacent a surface of the substrate that is not adjacent the at least one intrinsically conductive polymer. In still other embodiments, one of the first and second contacts may be adjacent a surface of the substrate that is not adjacent the intrinsically conductive polymer and the other of the first and second contacts may be adjacent a surface of the intrinsically conductive polymer.

The present sensors may be utilized as strain gauge sensors and/or damage sensors due to the presence of intrinsically conductive polymers as a component of the sensors. The conducting mechanism of intrinsically conductive polymers is different from metallic conductors. Because dopants in intrinsically conductive polymer formulations act as charge carriers and morphology of intrinsically conductive polymers have an important role in the conducting mechanism, minor changes in dopant concentration and morphology result in significant change in electrical conductivity or resistance. Strain or damage may result in such changes in dopant concentration and morphology of intrinsically conductive polymers. Accordingly, strain or damage to the sensor may result in a change in conductivity or resistance, providing an indication of strain or damage to an observer.

Substrates contemplated as useful in accordance with the present invention include one or more of plastics, fibers, fabrics, resins, composite materials, metals, concretes, wood, ceramics, and any combination thereof. In some embodiments, where the sensor is intended for use in conjunction with a composite material, it may be desirable to use the composite material or other compatible material as the substrate. Exemplary composite materials contemplated as useful substrates include one or more of carbon-fiber reinforced epoxy, glass-fiber reinforced epoxy, carbon-fiber reinforced BMI, and glass-fiber reinforced polyester.

Intrinsically conductive polymers contemplated as useful in accordance with the present invention include one or more of polyaniline, polypyrrole, polyacetylene, and poly(3,4-ethylenedioxy thiophene).

It may be desirable to utilize acid-doped intrinsically conductive polymers. The intrinsically conductive polymers may be doped using methods known to those having ordinary skill in the art. Acids contemplated as useful dopants include one or more of polystyrene sulfonate, 1-anthracene sulfonic acid, 9-antrhacene sulfonic acid, 2-phenanthrene sulfonic acid, 3-phenanthrene sulfonic acid, 9-phenanthrene sulfonic acid, $NO_2CF_3SO_3^-$, $CF_3SO_3H$, perfluoro octyl sulfonic acid, perfluoro octyl carboxylic acid, octylsulfonic acid, dodecylsulfonic acid, cetylsulfonic acid, toluenesulfonic acid (TsOH), Fe(OTs)$_3$, Fe(CH$_3$SO$_3$)$_3$, (FSO$_3$)$_2$, AgOTs, CH$_3$SiOTs, dodecylbenzene sulfonic acid, naphthalene sulfonic acid, benzene disulfonic acid, benzene sulfonic acid, 1,3-benzene disulfonic acid, 2,5-dihydroxy-1,4-benzene disulfonic acid, camphor sulfonic acid, camphor sulfinic acid, naphthalene trisulfonic acid, dodecylbenzene sulfonic acid, isethionic acid, 1,5-naphthalene disulfonic acid, nickel phthalocyanine tetrasulfonic acid, phenyl phosphonic acid, poly(vinyl sulfonic acid), 3,-sulfopropyl acrylate, 3-sulfopropyl methacrylate, sulfamic acid, 5-sulfosalicylic acid, tiron (4,5-dihydroxy-1, 3-benzene sulfonic acid), vinyl sulfonic acid, sulfanilic acid, 4-sulfophthalic acid, sulfoacetic acid, methyl orange, phenylphosphonic acid, dodecylbenzenesulfonic acid, sulfonated polystyrene, sulfonated poly(α-vinyl naphthalene), naphthol yellow, naphthol blue black, 1,2-naphthoquinone-4-sulfonic acid, naphthylazoxine S, 1-octane sulfonic acid, t-butyl phosphonic acid, ethyl phosphonic acid, butyl phosphonic acid, 1,2-benzene disulfonic acid, 4-octylbenzene sulfonic acid, 2-mesitylene sulfonic acid, 2,6-naphthalene disulfonic acid, 2-naphthalene sulfonic acid, 1,3,6-naphthalene trisulfonic acid, 1,3,7-naphthalene trisulfonic acid, sulfonazo III acid, biphenyl disulfonic acid, biphenyl sulfonic acid, 1,8-dihydroxynaphthalene-3,6-disulfonic acid, 3,6-dihydroxynaphthalene-2,7-disulfonic acid, 4,5-dihydroxynaphthalene-2,7-disulfonic acid, 6,7-dihydroxy-2-naphthalene sulfonic acid, 1-naphthalene phosphoric acid, 1-naphthalene sulfonic acid, 1-naphthalene-5,7-dinitro-8-hydroxy, 1-naphthalene-4-hydroxy sulfonic acid, 4-bromo benzene sulfonic acid, 4-hydroxy-5-isopropyl-2-methyl benzene sulfonic acid, 3,4-diamino benzene sulfonic acid, benzene phosphoric acid, 1,3,5-benzene trisulfonic acid, 2-methyl-5-isopropyl benzene sulfonic acid, 3,4-dinitro benzene sulfonic acid, 2-methoxy benzene sulfonic acid, 1-naphthalene-5-hydroxy sulfonic acid, 1-naphthalene 7-hydroxy sulfonic acid, dinonylnaphthalene sulfonic acid, p-toluene sulfonic acid, 1-naphthalene-3-hydroxy sulfonic acid, 2-naphthalene-1-hydroxy sulfonic acid, 4-phenylamino benzene sulfonic acid, and

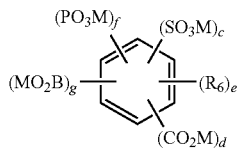

wherein M is a metal or non-metal cation, c is 1, 2, 3, or 4; d is 0, 1, or 2, f is 0, 1, or 2, g is 0, 1, or 2, e is 0, 1, or 2, and R$^6$ is nitro, cyano, hydroxy, halogen, alkoxy, phosphate, borate, carboxylate, substituted or unsubstituted aryl or alkyl having from 1 to about 30 carbon atoms wherein permissible substituents include perhaloalkyl, phenyl, alkoxy, halogen, cyano, haloalkyl, hydroxy, sulfonic acid, phosphoric acid, boric acid, sulfinate, sulfinic acid, carboxylic acid, nitro, carboxylate and the like, or any two R$^6$ substituents together may form an alkenylene chain completing a fused-ring system which chain may be unsubstituted or substituted with one or more halogen, phosphoric acid, hydroxy, boric acid, nitro, cyano, sulfinate, phosphoric acid, sulfinic acid, phosphate, carboxylate, phosphonic acid, phosphonate, sulfonate, borate, sulfonic acid or carboxylic acid groups, or R$^6$ is a moiety of the formula:

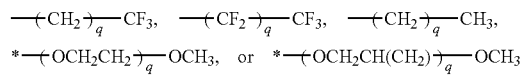

wherein q is a positive whole number from 1 to about 10.

The first and second metal contacts may function as electrodes. Exemplary contact materials contemplated as useful in accordance with the present invention are independently selected and include one or more of copper, copper-based hybrids, silver, carbon, carbon nanotubes, graphenes, silver/carbon composites, silver-based hybrids, gold, gold-based hybrids, indium-tin-oxide, fluoride-doped tin oxide, fluoride-doped zinc oxide, gallium-doped zinc oxide, aluminum-doped zinc oxide, antimonium-tin oxide, and zinc-tin oxide. As used herein, the term "independently selected" means the contact materials of each of the first and second contacts may be selected without regard to the material of the other contact, so long as the first and second contacts conduct cooperatively.

In some embodiments, it may be desirable for the first and second metal contacts to be formed of the same material. In other embodiments, it may be desirable for the first and second contacts to be formed of different materials.

In some embodiments, it may be desirable to utilize a piezoelectric material as a substrate. Piezoelectric materials generate an electric potential in response to applied mechanical stress. In many cases, the piezoelectric effect is reversible, i.e., materials that produce an electric field when stress is applied also exhibit the reverse piezoelectric effect and produce stress and/or strain when an electric field is applied. Ferroelectrics are man-made materials that exhibit piezoelectric constants many times higher than natural materials. Ferroelectric materials contemplated as useful in accordance with the present invention include one or more of barium titanate, lead titanate, lead zirconate titanate, potassium niobate, lithium niobate, lithium tantalite, sodium tungstate, lead lanthanum zirconate titanate, polyvinylidene fluoride, copolymers of polyvinylidene-fluoride, foam-structured polymers (also known as ferroelectrets, these materials exhibit piezoelectric and pyroelectric properties after charging), and other ferroelectric materials known to those having ordinary skill in the art.

In embodiments that utilize a piezoelectric material or ferroelectric material as the substrate, it may be desirable to coat opposing surfaces (directly opposite surfaces) of the piezoelectric material or ferroelectric material with at least one intrinsically conductive polymer. It may be desirable to coat different intrinsically conductive polymers on each of the opposing surfaces of the piezoelectric material or ferroelectric materials. Additionally, it may be desirable to coat more than two surfaces, in some embodiments, all surfaces, of the piezoelectric material or ferroelectric material with one or more intrinsically conductive polymers. Intrinsically conductive polymers contemplated as useful in accordance with the present invention include those discussed above.

Piezoelectric materials or ferroelectric materials exhibit generation of voltage versus the applied mechanical wave or acoustic wave, due to changes in the material properties coupled to the polarization. Accordingly, changes in the electric field may be manifested in the piezoelectric or ferroelectric, enabling the piezoelectric material or ferroelectric material to act as a sensor when coupled to intrinsically conductive polymers as discussed below.

In such embodiments, the intrinsically conductive polymer(s) may function as an electrode. Where the intrinsically conductive polymer(s) serve as electrodes, it may be desirable to deposit one or more metal contacts on the opposing surfaces of the sensor device to provide improved connection capabilities to clips from devices used to measure the conductivity of the system. Stated differently, in such embodiments it may be desirable for the first contact to be adjacent the first intrinsically conductive polymer layer as described above while the second contact is adjacent a surface of the second intrinsically conductive polymer that is not adjacent the substrate.

When piezoelectric materials or ferroelectric materials are utilized as the substrate, in accordance with this embodiment of the invention, the sensors may be considered passive sensors, as they do not require a power source to operate. Instead, they generate a readily measured charge (voltage) when a strain is applied, allowing for ease of data acquisition. In addition to passive monitoring, the piezoelectric or ferroelectric sensors allow for actuation as well as sensing for in-situ health monitoring of composite structures. A stress wave traveling through the structure will be reflected/diffracted and subject to wave mode conversions by material and structural discontinuities (such as disbonds, delaminations, and other damage).

Damage and strain sensors in accordance with the present invention may have a length from about 10 microns to about 500 mm, in some embodiments, from about 0.5 mm to about 250 mm, in other embodiments, from about 1.0 mm to about 50 mm. The thickness of sensors in accordance with the present invention may be from about 10 nm to about 1000 microns, in some embodiments, from about 250 nm to about 500 microns, in other embodiments, from about 500 nm to about 10 microns.

It may be desirable for the at least one intrinsically conductive polymer to substantially completely coat one surface of the substrate. In some embodiments, the at least one intrinsically conductive polymer may only cover a portion of one surface of the substrate. It may be desirable for the intrinsically conductive polymer to cover at least 90% of the surface of the substrate, in some embodiments, from about 1% to about 90% of the surface of the substrate, in other embodiments, from about 40% to about 80% of the substrate.

Sensors produced in accordance with the present invention are flexible, lightweight, robust, and stable under adverse conditions and extreme environments. The present sensors may be stable to temperatures in excess of 125° C., in some embodiments in excess of 200° C., in other embodiments, in excess of 280° C.

In another aspect, the invention is directed to a method of fabricating a sensor. The method includes depositing on a first surface of a substrate at least one intrinsically conductive polymer and depositing on the at least one intrinsically conductive polymer a first and second contact in communication with at least one of the intrinsically conductive polymer coating or the substrate. In another embodiment, the method includes depositing on a first surface of a substrate a first and second contact and depositing over the first and second contact at least one intrinsically conductive polymer. In a different embodiment, the method includes depositing one of the first and second contacts prior to the deposition of the at least one intrinsically conductive polymer and depositing the other of the first and second contact after deposition of the at least one intrinsically conductive polymer. In a different embodiment, the method may include depositing each of the first and second contacts on opposing surfaces of the substrate.

The at least one intrinsically conductive polymer may be deposited by methods known in the art. Exemplary methods include depositing the intrinsically conductive polymer by screen printing, spray coating, aerosol jet coating, inkjet printing, powder coating, wire-wounded rod, draw down bar, brush coating, flow coating, slot coating, dip coating, and other methods known to those having ordinary skill in the art.

When screen printing, an ink including at least the active component of a respective layer, i.e., the intrinsically conductive polymers layer, and a binder is formed. That ink is then passed through the screen and deposited onto the substrate or a previously printed layer. The ink may then be cured or dried to form the desired layer of the sensor. It may be desirable to print more than one coat of a particular layer.

In some embodiments, it may be desirable to cure or dry each coat after screen printing and before printing the next, adjacent coat. In other embodiments, it may be desirable to print more than one coat before curing the printed coats. In yet other embodiments, it may be desirable to print all coats before curing the layer. In still other embodiments, it may be desirable to partially cure a coat before printing the subsequent coat.

Curing may be conducted via high temperature cure or drying, IR drying UV-cure, e-beam cure, or chemical curing. One having ordinary skill in the art would recognize the appropriate curing method based on the components of the layer or layers being cured. In some embodiments, more than one method of curing may be used on a single layer and/or on multiple layers.

The layers may be printed using one, two, three, or four printings for each layer. The layers may be printed through different mesh screens, depending on the particle sizes of the components in the various layers and the desired amount of ink to be printed.

Additionally, it may be desirable to partially cure a first layer and deposit a subsequent layer before the first layer is fully cured. This optional embodiment may allow for improved adhesion between layers.

Exemplary materials for the first and second contact may be independently selected from the contact materials discussed above. The contacts may be deposited by one or more of screen printing, spray coating, aerosol jet coating, inkjet printing, dipcoating, powder coating, wire-wounded rod, draw down bar, brush coating, flow coating, slot coating, adhesion, or other methods known to those having ordinary skill in the art.

The sheet resistance of sensors fabricated according to the present method may be calculated by the following equations:

$$p=R(A/L)=R(ad/b)$$

and $$R_s=R(a/b)$$

where p is resistivity, R is resistance, $R_s$ is sheet resistance, A is area, L is length, a is width, b is distance between electrodes, and d is thickness of the sensor layer.

Sheet resistance of sensors formed in accordance with the present invention may be from about 0.1 kΩ to about 100 MΩ, in some embodiments from about 1 kΩ to about 1 MΩ, in other embodiments from about 1 kΩ to about 100 kΩ.

The resistance values of the sensors vary with strain. Accordingly, a change in resistance will indicate that the sensor has been subjected to damage or strain. The conductivity values of the sensors will vary with strain or damage as well. Accordingly, a change in conductivity will indicate the sensor has been subjected to damage or strain.

Conductivity, impedance, resistance, sheet resistance, and/or capacitance of the present sensors may be monitored by methods known in the art. For example, they may be monitored by one or more of electrometers, voltmeters, impedance analyzers, a multimeter, wheatstone bridge circuits, LCR meters, and waveform analyzers.

In some embodiments, wireless techniques may be utilized to monitor the conductivity, resistance, sheet resistance, and/or capacitance of the present sensors, reducing the instrumentation and wiring required to monitor the system. This embodiment may be particularly applicable to sensors incorporating ferroelectric materials. As discussed above, ferroelectric materials are known to manifest changes in the electric field of the surroundings. In some embodiments, the manifestation of the change in the electric field is in the form of a wave, such as an acoustic wave. Accordingly, when a sensor including a ferroelectric material is utilized in accordance with the present invention, that sensor may emit acoustic waves when strain or stress is applied to the sensor. That acoustic wave may be detected wirelessly, reducing the instrumentation and wiring required to monitor the system. Such wireless monitoring may be conducted in real-time, immediately, and/or quickly indicating the occurrence of damage and/or strain.

In wireless embodiments, such as those discussed here, the detector may be in a remote position or may be situated closely to the sensor. Exemplary detectors may be located a distance of from about 25 mm to about 100 km from the sensor, in some embodiments from about 25 m to about 75 m.

In another aspect, the invention is directed to a composite material comprising a sensor. The sensor includes a substrate having at least one intrinsically conductive polymer coated on at least a first surface thereof; and at least a first and second conductive contact in communication with at least one of the intrinsically conductive polymer coating or the substrate.

Composite materials contemplated as useful in accordance with the present invention include composites known in the art as being useful for the building of various structures, such as those discussed above. In some embodiments, the composites will be laminate materials, with different layers compacted together to form the composites. In such composites, the various layers may comprise the same or different materials, so long as the materials are compatible for forming the composites. Exemplary composite materials contemplated as useful include one or more of carbon-fiber reinforced epoxy, glass-fiber reinforced epoxy, carbon-fiber reinforced BMI, and glass-fiber reinforced polyester.

The present sensors, as discussed above, may be incorporated onto or into the composites. In some embodiments, the sensors may be applied to a surface of the composite material. In other embodiments, the composites may be embedded into the composite, for example, between different layers of a laminate composite.

It may be desirable to incorporate an array of sensors onto or into a composite material. When an array of sensors is utilized, the sensors may be better positioned to detect strain and/or damage in different areas of the composite. It may be desirable, therefore, to incorporate sensors such that the distance between sensors is from about 1 micron to about 1 m, in some embodiments from about 500 micron to about 100 mm, in other embodiments, from about 1 mm to about 10 mm.

Additionally, it may be desirable to incorporate sensors between different layers of a laminate composite material. In some embodiments, it may be desirable to include sensors on the surface of a composite as well as embedded into the composite. Those having ordinary skill in the art will recognize the different locations of the composite in which the sensor may be incorporated and any combination of these locations is contemplated as useful in accordance with the present invention.

Figure 8:
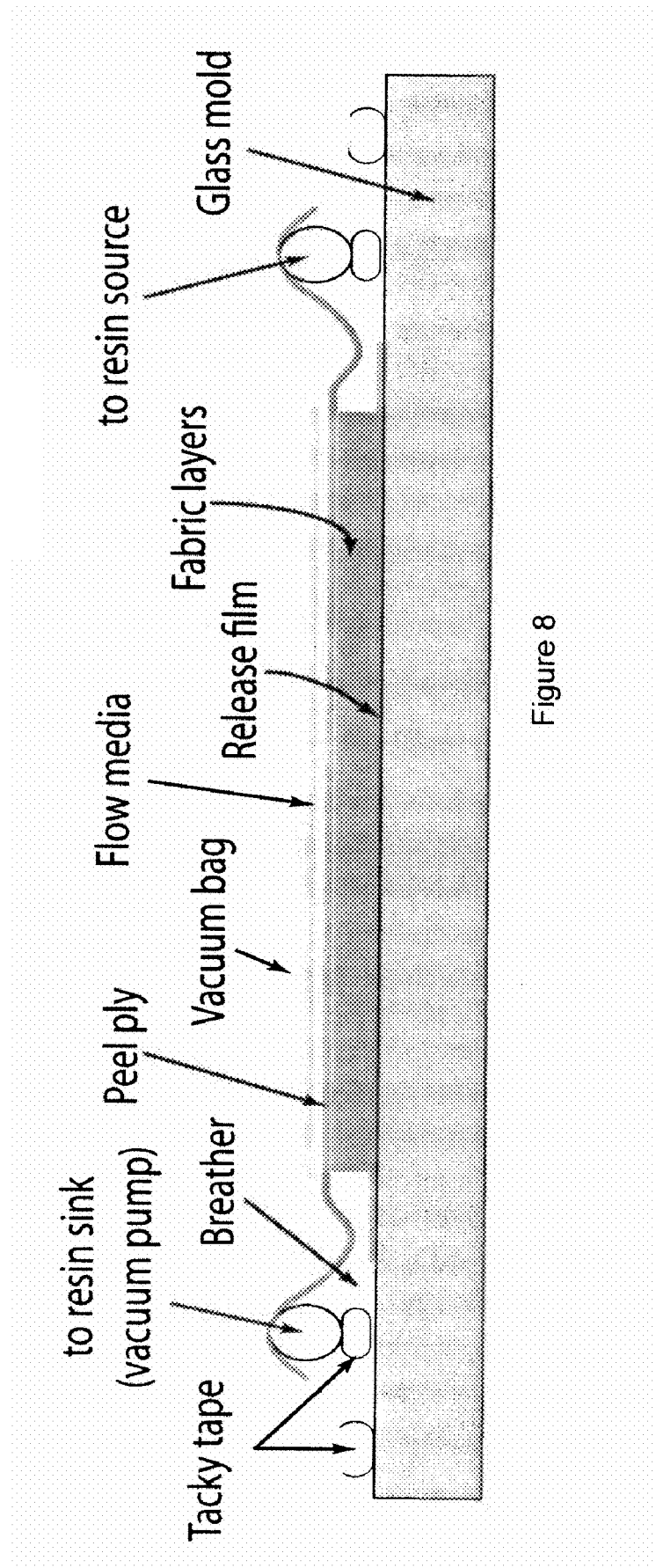
FIG. 8 is a schematic of an exemplary VARTM process for forming sensors in accordance with the present invention.

In some embodiments, it may be desirable to utilize a method commonly referred to as vacuum assisted resin transfer molding (VARTM). This process may be used to fabricate large composites with high fiber volume fraction. This process typically requires the mold on only one side of the composite to be formed and the other side is covered with a vacuum bag. This eliminates the need for fabricating matching molds for composite fabrication using other and/or additional resin infusion techniques. Additionally, the vacuum serves for resin infusion as well as panel compaction during the cure process. Due to the low suction pressure typically utilized, often less than or equal to one atm, during VARTM, low viscosity epoxy resins systems may be utilized. A highly permeable membrane may also be used to provide a readily available pathway for the resin and faster processing times. FIG. 8 is a schematic representation of composite fabrication using VARTM.

In the VARTM process, a mold surface, for example a glass plate or aluminum, may be initially prepared with the use of a releasing agent (either wax or a release spray known in the art). This may aid in easy removal of the panel after curing. Composite materials, for example, carbon fiber fabric layers, may then be laid down in the desired sequence. A boundary of vacuum sealant may be prepared using, for example, tacky tape, leaving enough space for resin inlet and outlet lines. The inlet and the outlet lines may be prepared using plastic and spiral tubing known in the art. A small breather cloth may also be placed between the fabric and the outlet line (the line connected to the resin trap and vacuum pump). This cloth may act as the initial resin trap and reduce the amount of resin entering the outlet line. A peel ply is placed on top of the fabric layers as shown in FIG. 8. The flow media may then be positioned on the fabric so that it covers the entire composite. Finally, the whole area may covered by a vacuum bag.

After the setup is complete, the resin inlet line may be sealed using a small piece of tacky tape to block the tube opening and the system may then be left under vacuum for a sufficient time to expel trapped air. The system should be checked for the presence of air leaks. If any air leaks are located, they should be eliminated before composite fabrication begins. The composite material, for example an epoxy resin system, may be prepared and kept under vacuum in an oven for degassing. After degassing of the system and the composite material, the resin can be allowed to impregnate in preform. The resin should be allowed to flow until it covers substantially all of the area on the mold designated for composite formation. It may be desirable in some embodiments to allow some extra resin to flow across the composite for impregnation in the out-of-plane (z) direction. The outlet line may then be sealed using two tube clamps. In some embodiments, it may be desirable to place the outlet line in the resin beaker to avoid any air bubble entering into the composite preform.

High vacuum, for example from about 25 to about 28 in Hg, in some embodiments about 25 in. Hg, may be utilized during resin impregnation. Additionally, it may be desirable in some embodiments to reduce the suction pressure during the curing period to a pressure of from about 15 to about 20 in Hg, in some embodiments, about 15 in. Hg for the remaining curing period. Pressure may be reduced to avoid excess resin extraction for thin resins with longer gelation times.

In yet another aspect, the invention is directed to a method of sensing damage in a composite material. The method includes incorporating a sensor into the composite, the sensor including a substrate having at least one intrinsically conductive polymer coated on at least a first surface thereof; and at least a first and second conductive contact in communication with at least one of the intrinsically conductive polymer coating or the substrate.

The method further includes detecting changes in the conductivity and/or resistance of the intrinsically conductive polymer over time. By detecting the changes in conductivity and/or resistance over time, long-term decay may be detected in the composite material. Accordingly, any gradual degradation of the material may be monitored and the material may be replaced or repaired before the gradual degradation becomes an obstacle to continued use of the composite material.

By incorporating the sensors into or onto the composite, the sensors will be subjected to the same strain and/or damage as the composites. Accordingly, the conductivity and resistance of the sensors will be affected by the strain and/or damage that affects the composites. Monitoring the resistance and/or conductivity, therefore, will indicate the presence of strain and/or damage in or to the composite. Oftentimes, such strain or damage will not be visible or apparent absent sensor notification. Accordingly, the present sensors enable earlier detection of strain and/or damage, thereby enabling earlier (and potentially less expensive) maintenance and prevention of catastrophic failures of the composite materials.

Strain sensing under static and dynamic load conditions is desirable for many structures, such as aerospace structures, civil infrastructure systems, and machinery. Strain sensing is different from damage sensing because of the reversibility of strain and irreversibility of damage. Reversible strain can only be sensed in real time, whereas damage does not have to be sensed in real time.

A structural material that is, itself, a sensor, such as the presently disclosed composites incorporating a sensor, may perform better than previous sensors that have different substrates than, or incompatible substrates to the substance of the composite.

With respect to damage sensors, nondestructive methods that do not require modification of the composites may be desirable. In the present invention, the sensors may include substrates that are the same material as the composites or materials that are compatible with the composites (as discussed above). Accordingly, the sensors may be incorporated into the composites and may become a permanent part of the composite, resulting in the ability to sense damage in real-time or at a later time.

As discussed above, a variety of methods for monitoring the sensors to detect damage in the composites are contemplated as useful in accordance with the present invention. When damages or strain occur, an acoustic wave will be emitted from the composite. That acoustic wave may then be detected by methods in the art known for detecting acoustic waves. The frequency, wavelength, period, amplitude, intensity, speed, polarization, and direction of the acoustic wave may also be an indicator of the degree of strain and/or damage experienced by the composite. The speed of sound is proportional to the square root of the ratio of the elastic modulus ($\lambda$) of the medium to its density ($\rho$). Thus, as the elastic modulus changes due to damage or excessive strain, the speed of sound will change. This will provide information regarding the extent of the damage to the composite and the immediacy of the need for repair.

Composite matrix materials exhibit diminished performance over time. Predicting material performance is essential for reliable engineering factors; yet, there is a strong disconnect between material theory and predictive environmental stability for matrix materials. Characterizing network failure initiation points before catastrophic macroscopic performance loss is critical to accurately predict failure and make the next step towards mediating the initiation events for elongated material performance.

The following examples describe exemplary embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

EXAMPLE 1

This example demonstrates an exemplary method of forming DNNSA doped polyaniline. 0.1 mole of DNNSA (as a 50 wt % solution in 2-butoxyethanol), 0.06 mol of aniline, and 200 mL of water were mixed to form a milky-white emulsion. The emulsion was chilled to 5° C. under a nitrogen blanket while mechanically stirred. 0.074 mol of ammonium peroxydisulfate (APS) in 40 mL of water was added drop-wise to the mixture. The white color of the mixture changed to amber. The reaction proceeded for 17 hours, during which time the emulsion separated into a green organic phase and a colorless aqueous phase.

The organic phase was washed with water, leaving a dark green, highly concentrated PANI/DNNSA in 2-butoxyethanol. This concentrate was soluble in xylene.

EXAMPLE 2

This example demonstrates an exemplary method of forming DBSA-doped polyaniline and determining the resistance of the doped polyaniline to extreme temperatures. 0.24 mol of DBSA (as a 50 wt % solution in 2-butoxyethanol) and 0.16 mol of aniline were dissolved into 200 mL of water below 0° C. and under a nitrogen blanket while mechanically stirred. 0.2 mol of APS in 100 mL of water were added drop-wise to the mixture. The reaction proceeded for about 1~2 hours. 200 mL of methanol were added to induce precipitation of the product. The product was filtered and dried at 45° C. in vacuum oven. The dark green powder of PANI/DBSA was then dissolved in toluene. The PANI/DBSA was dried under vacuum at 50° C. overnight.

Titanium thermogravimetric analysis (TGA) pans were obtained from TA Instruments. The pans were cleaned using a torch to burn out any residue. Clean pans were placed onto the auto-sampler and weighted by the TGA to determine the pan mass. Approximately 20 mg of the dried PANI/DBSA was placed into the TGA pans. The sample was then placed into the auto-sampler and a run procedure was entered in the TA software. The samples were heated from room temperature to 700° C. at a rate of 20° C. per minute.

Figure 2:
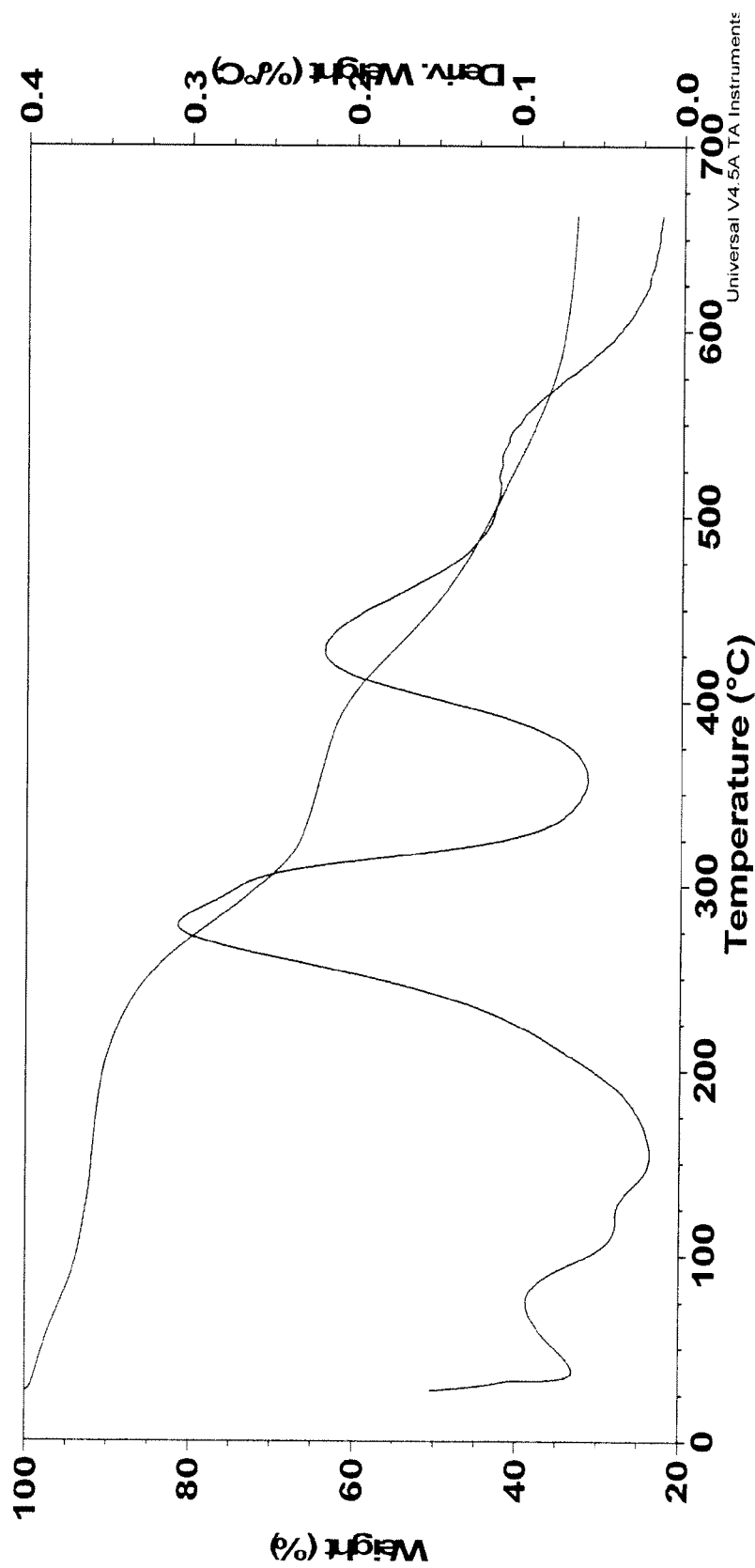
FIG. 2 is a graph showing the derivative of the chart in FIG. 1.

PANI/DBSA showed two distinct degradation events (FIG. 1). PANI/DBSA showed initial degradation at around 250° C. followed by another event beginning at about 400° C. The initial degradation is most likely due to de-doping of the DBSA from the PANI. This event also contains the degradation of DBSA. When TGA of neat DBSA was performed, the onset of degradation was determined to be around 250° C. Without being bound by theory, it is believed the initial weight loss (250° C.-350° C.) in the PANI/DBSA material is more gradual than the weight loss in neat DBSA because of the ionic interactions of the DBSA with the polymer chains. The second weight loss event is due to the degradation of the PANI chains. It is difficult to see the actual onset of degradation from FIG. 1. In order to more accurately determine the degradation onset, FIG. 1 was manipulated by taking the derivative (FIG. 2).

The peak temperatures are labeled, however the peak of the derivative is an inflection point and does not indicate the onset of degradation. The onset of degradation is where the y-value of the derivative plot begins to increase rapidly.

The thermogravimetric analysis of PANI/DBSA materials indicates stability of the products until a temperature of 250° C. At this point it is suspected that the PANI de-dopes and the DBSA degrades. TGA data also suggests the PANI chains in PANI/DBSA are stable to temperatures between 375° C. and 400° C. It should be noted, however, that at these temperatures PANI/DBSA would not be conductive due to the de-doping of DBSA at 250° C.

EXAMPLE 3

This example demonstrates a method to quantify undoped or doped PANI samples utilizing differential scanning calorimetry (DSC).

Figure 3:
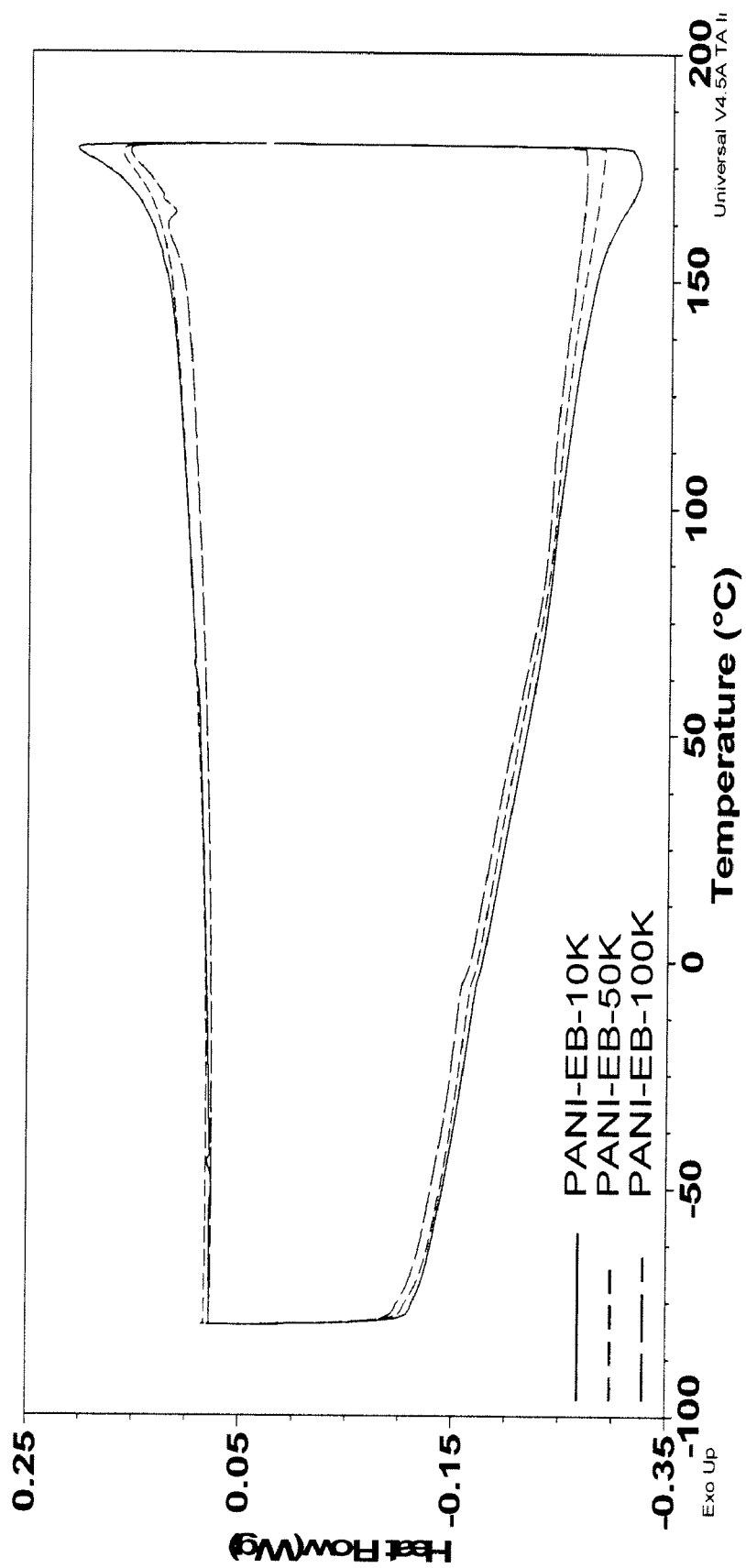
FIG. 3 is a graph showing the differential scanning calorimetry of commercially available PANI-EB to determine the $T_g$ of the substance.

Standard aluminum pans and lids were obtained from TA Instruments. The mass of the sample pan and lid was recorded. The balance was then zeroed and approximately 5-10 mg of solid sample (prepared according to the procedures set forth in Examples 1 and/or 2) were added. The pan with the sample was weighed and the mass was recorded. Two samples were prepared for each material being analyzed. Prepared samples were placed into the auto-sampler with the appropriate reference pan. The mass of the reference pan was also recorded. Run procedure was set as follows:

1. Cool to −80° C. at 5° C./minute
2. Isotherm for 2 minutes
3. Ramp to 180° C. at 10° C./minute
4. Isotherm for 2 minutes
5. Cool to −80° C. at 5° C./minute
6. Isotherm for 1 minute
7. Ramp to 180° C. at 10° C./minute
8. Isotherm for 2 minutes
9. Cool to 25° C. at 5° C./minute Liquid samples used the same heating procedure, but were placed in hermetically sealed pans. PANI EB (emeraldine base) was analyzed using the procedure above for 10K, 50K and 100K g/mol molecular weight samples (FIG. 3).

A very small endothermic event was seen in all cases between −4° C. and 0° C. This transition could be due to water in the sample, but this scenario is unlikely given the run procedure of the DSC experiment outlined above. The sample was heated to 180° C. before the data began to record. Given the extremely small magnitude of this endothermic event, it is difficult to characterize with any degree of certainty. The samples show another endothermic event later in the heating process. At around 60° C. to 70° C., a slightly more defined endotherm is seen. This endotherm is associated with the $T_g$ of PANI and is consistent with literature.

Differential scanning calorimetry of commercially available undoped PANI EB (Aldrich) shows an endothermic transition well below the reported values of the glass transition temperature, $T_g$, for PANI. It is possible this transition is simply evaporation of water. This scenario seems unlikely due to the elevated temperature of the initial DSC heating. However, it is possible that some residual water stayed in the sample even after the initial heating. The $T_g$ of PANI EB according to DSC was between 60° C. and 70° C. depending on the molecular weight of the sample. The transition has a very small magnitude and is therefore difficult to distinguish precisely.

What seems to be a sizeable endotherm, $2^{nd}$ order transition is noticed at approximately 160° C. in the DSC graph of 10,000 g/mol PANI EB. This type of event usually indicates $T_g$ being reached. However, the sample was only taken to 180° C. making it difficult to determine if this is in fact the real $T_g$. This event is not seen in the higher molecular weight samples. This could be due to the basic principle that higher molecular weight polymers exhibit higher $T_g$s.

EXAMPLE 4

In this example, EMPAC™ 1003 (Crosslink, Fenton, Mo.) was used as sensor material and BONDCOTE™ 1677 fabric (BondCote) was used as a substrate to form an ICP strain gauge sensor. EMPAC™ 1003 was diluted to 20 wt % with xylene or xylene/butyl cellosolve mixture and the BONDCOTE™ 1677 fabric was steam cleaned. The EMPAC™ 1003 was coated onto the BONDCOTE™ 1677 fabric via a screen-printing process. The coated fabric was air-dried for 30 minutes and cured for 30 minutes at 150° C., then cooled to ambient temperature. Silver electrodes were then screen-printed onto the cured fabric and cured for 5-20 minutes at 150° C.

The resistance changes of the ICP strain gauge were measured to determine the sensor specimen's performance relative to external force. An Agilent 4263B LCR meter was connected to a computer with LabView interface to record the resistance changes. The four probe Agilent 4263B LCR meter was then attached to the silver electrodes. A reversible tension was applied to the substrate and the resistance change were measured and recorded. This measurement technique is schematically represented in FIG. 4.

Figure 4:
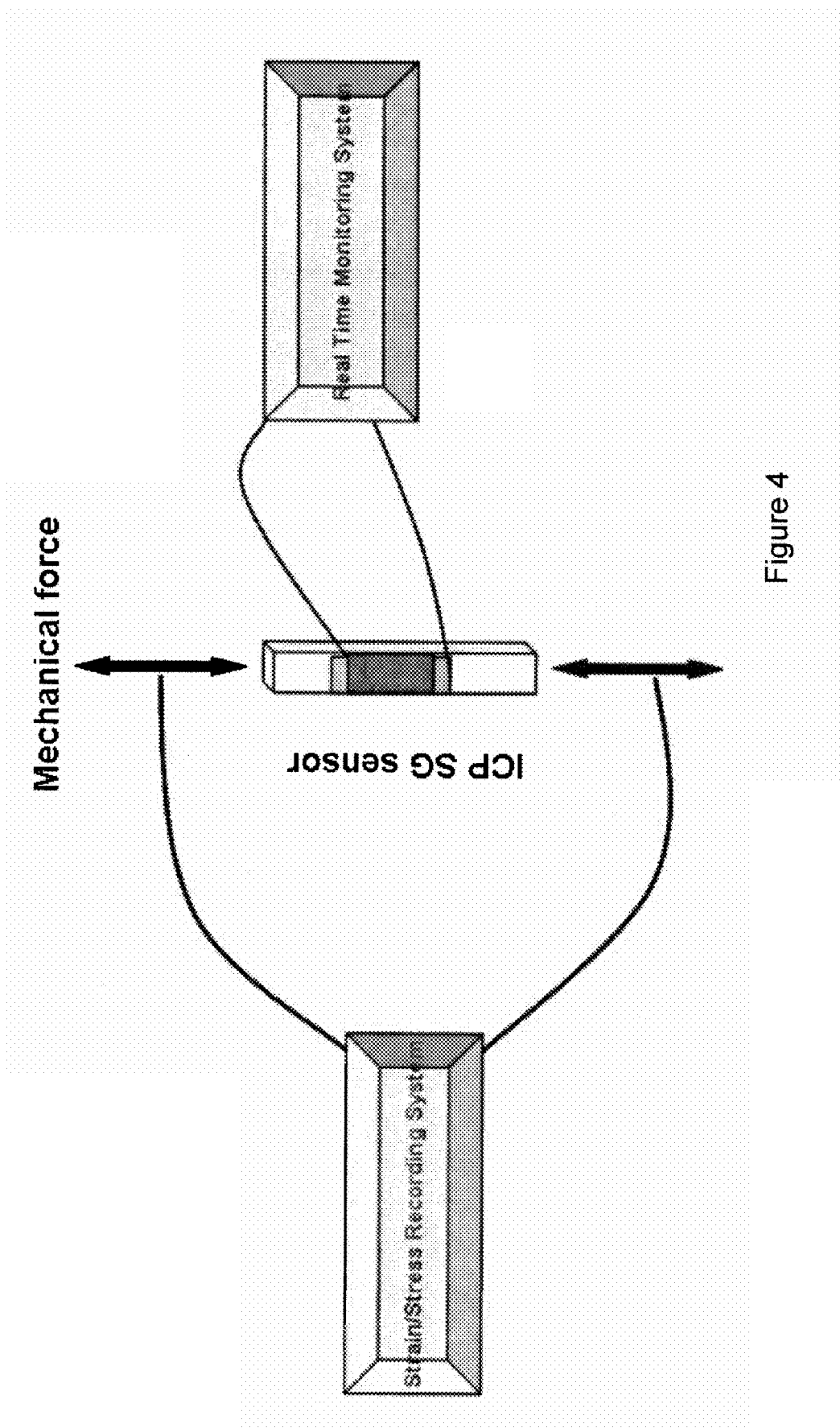
FIG. 4 is a schematic depiction of an exemplary method for testing the present sensors.

The curve of stress induced resistance changes versus time was recorded by the real time monitoring system (RTMS) depicted in FIG. 4. This test was used to correlate resistance changes of the ICP strain gauge sensor to strain/stress applied to the specimen, which is also system correction method for final application. The RTMS will be used to display ICP strain gauge sensor performance under load condition.

Figure 5:
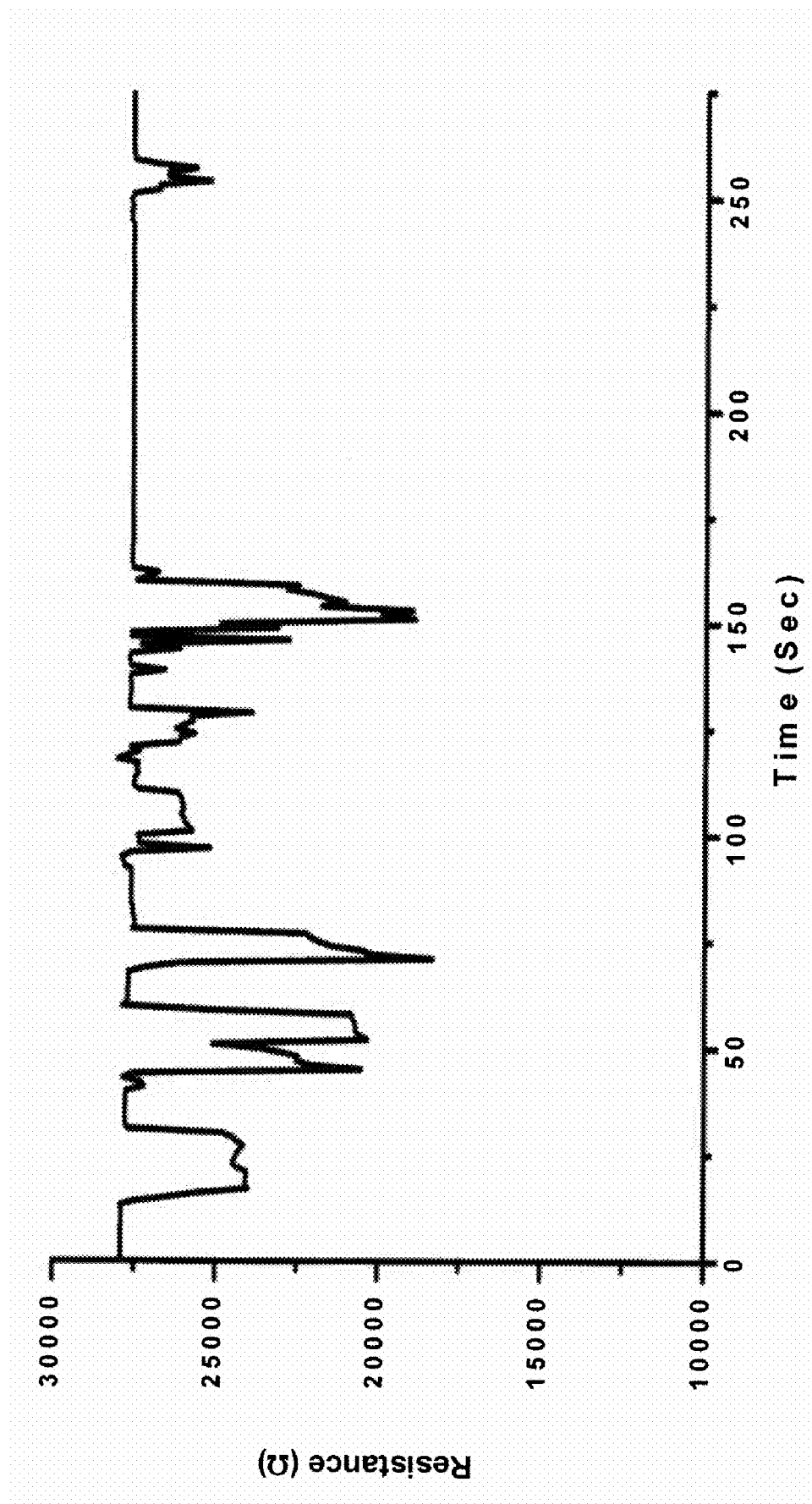
FIG. 5 is graph showing an example of the resistance changes in an exemplary sensor produced in accordance with the present invention when reversible tension is applied to the sensor.

When tension was applied the ICP strain gauge sensor, the resistance changed as the loading force varied. For example, FIG. 5 shows the drive resistance changes to reversible tension (stress/strain curve is not included), which can be used to predict the strain tolerance of the product.

EXAMPLE 5

In this example, an ICP damage sensor was fabricated utilizing the same method described in Example 5 for forming an ICP strain gauge. To test damage sensing, a non-reversible tension was applied to the specimen. An MTS 810 material testing system was used as the non-reversible tension source.

Figure 6:
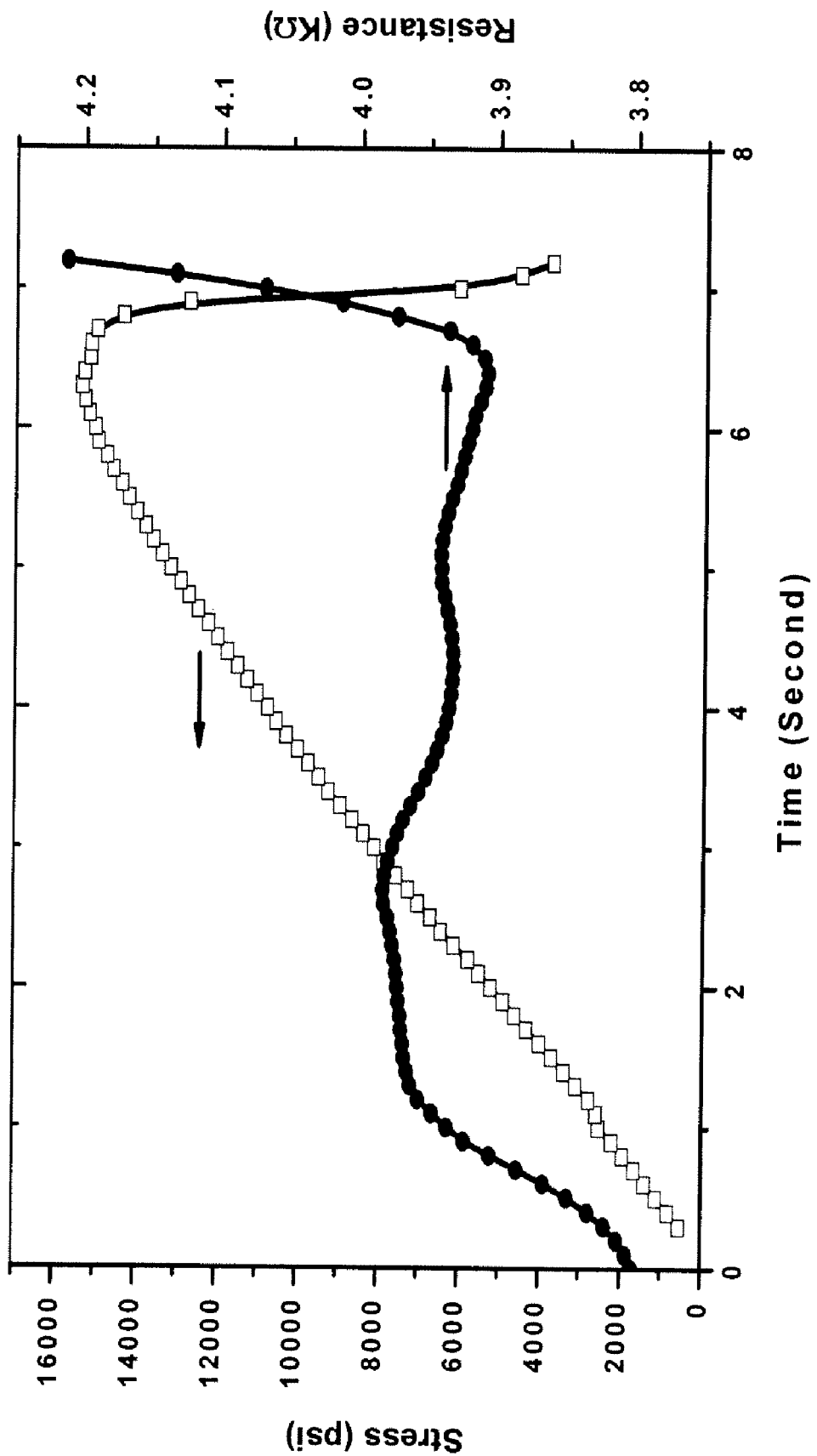
FIG. 6 is graph showing an example of the resistance changes in an exemplary sensor produced in accordance with the present invention when non-reversible damage is applied to the sensor.

The curves of stress/resistance vs. time under non-reversible condition are shown in FIG. 6. During the test, the resistance increased as the stress increased. When the stress reached a certain value (about 7000 psi), the resistance remained at about the same level as stress increased. When stress reached the yield point, the testing sample clumped and bent when it went back to original position. A broken specimen status resulted in the resistance jump. This monitoring system can be used to detect damages.

EXAMPLE 6

Figure 7:
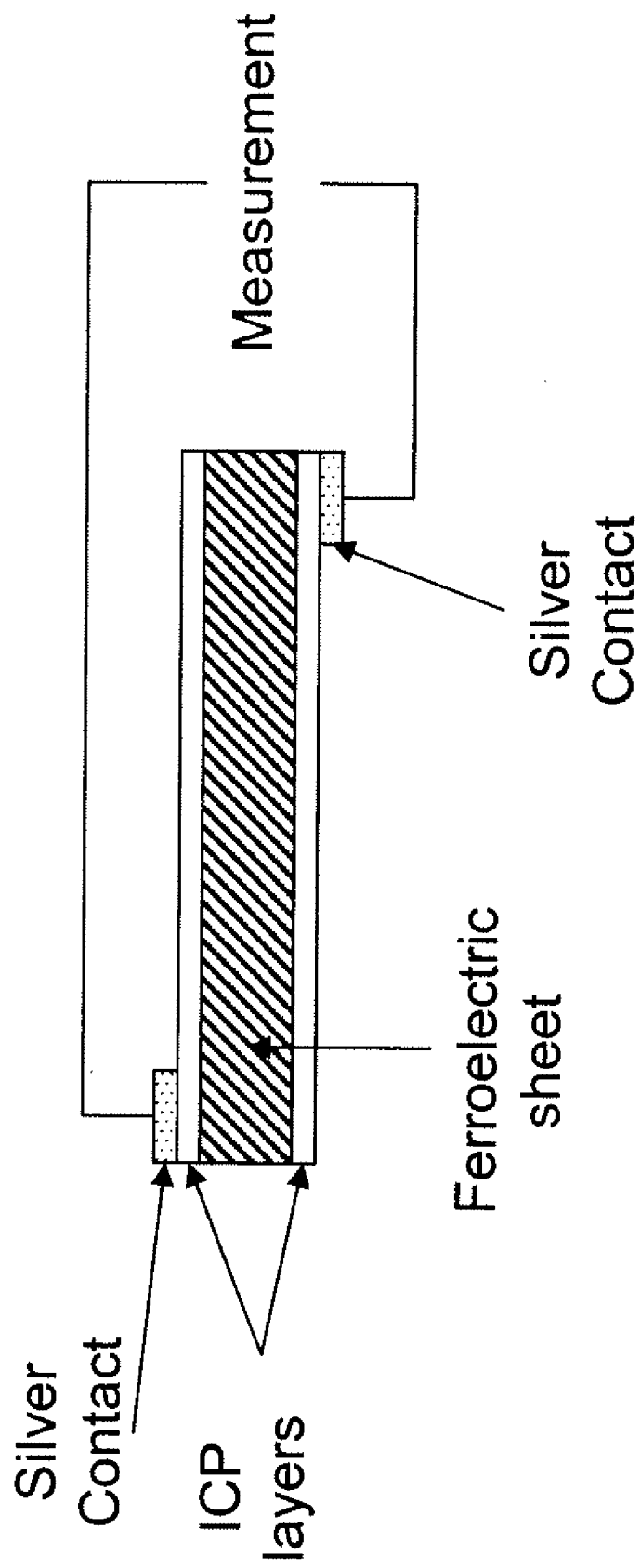
FIG. 7 is a schematic of an exemplary sensor formed in accordance with the present invention.

This example illustrates that intrinsically conductive polymers may be used as electrodes for sensor applications. In this example, a ferroelectret polymer is used as the sensing material. To reduce the total weight of the sensor, an ICP was used for the electrodes, instead of high density metallic electrodes. With electrodes on both sides, the ferroelectret material acts as a capacitor, whose value changes with dimensional variation of the composite. (FIG. 7)

The ferroelectric materials used are in polyolefin foam. This form has fine pores inside. The foam was stretched and made as a film. It was charged with high voltage corona treatment. The capacitance of this ferroelectric material is changed by dimension of pours. Stated differently, an air bubble forms, so that the sensitivity to the dimensional changes can be higher than other solid capacitors.

For this example, EMPAC™ 1003 was used as the electrodes to form a light-weight system. Generally, silver is used as the electrode and its density is 10.49 g/cm$^3$ in contrast to 085-1.50 g/cm$^3$ for EMPAC™ 1003. EMPAC™ 1003 was diluted to 20 wt % with xylene or xylene/butyl cellosolve mixture; then coated on to the surface of the ferroelectric sheet. EMPAC™ 1003 was air-dried at room temperature for 30 minutes and then dried in the oven at 150° C. for 30 minutes. After cooling to room temperature, the other surface of the ferroelectret material was also coated with EMPAC™ 1003 using the same procedure. A silver contact was prepared on EMPAC™ 1003 layer using a screen printing technique to provide good contact with the clips from the LCR meter. The printed silver contact was cured for 5-20 min at 150° C. The capacitor prepared with ICP is schematically depicted in FIG. 7. The prepared capacitor was 2.1 cm×2.6 cm. The capacitance (as measured by the Agilent 4263 LCR meter) was 0.14 nF.

EXAMPLE 7

To form a composite in accordance with the present invention, the previously-discussed VARTM process was used to fabricate a composite with high fiber volume fraction (FIG. 8). A combination of unidirectional fiber tape and woven fabrics were used to fabricate eight layered composites. This combination was used to impart mechanical strength to the composite in transverse directions, while having unidirectional fibers as the faceting sheets. This composite build focuses on achieving identifiable strain behavior using ICP films.

A SC-15 epoxy resin system was used for composite panel fabrication. The composite was initially cured at ambient temperature for 24 hours under vacuum and post-cured at 100° C. for five hours in an oven. The two-phase epoxy resins, SC-15, were acquired from Applied Poleramic, Inc. (Benicia, Calif.). Typical properties of the resin are listed in Table 1:

TABLE 1

| Properties of SC-15 epoxy resin system | |
|---|---|
| Type | Two Phase |
| Mix Ratio A/B (wt) | 100/30 |
| Post Cure (° C.) | 5 hours at 100° C. |
| $T_g$ dry (° C.) | 114 |
| $T_g$ wet (° C.) | 82 |
| Fracture Toughness (psi/in$^2$) | 1400 |

The prepared composite was cut to form coupons having an speed diamond tile saw. The edges were then polished on an Isomet 100 approximate width of 25.4 mm using a Husky high 0 (Buehler, Lake Bluff, Ill.) to get smooth edges and remove burrs that appear due to cutting. The specimens were then dried overnight in an oven at 50° C. The ICP based strain gauge was then spray-coated on the coupons in a central region.

Specifically, 10% by weight PANI/DNNSA was spray coated on the central 25 mm of the coupon. The coating was then cured at 100-200° C. for 10-16 minutes or at 100° C. for 2 hours on composite substrates and at 150° C. for 30 minutes for TEFLON® substrates. After curing, copper tape electrical contacts were attached onto the coating.

Figure 9A:
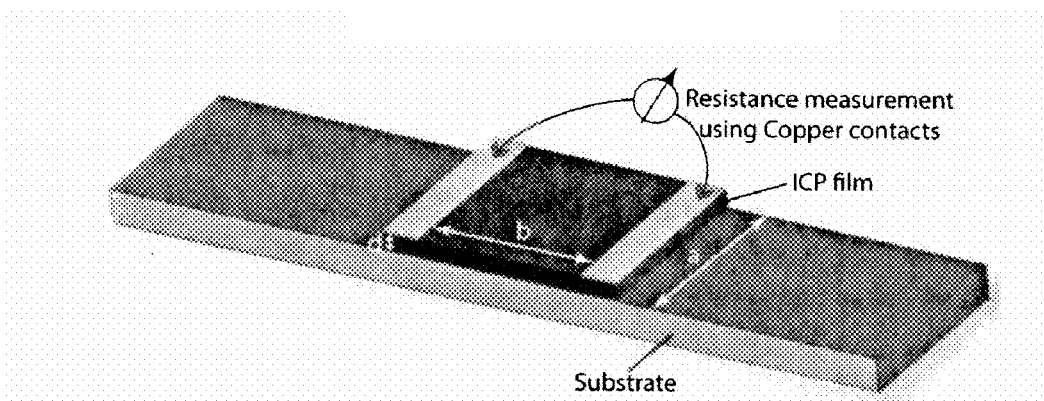
FIG. 9(a) is a schematic of an exemplary sensor formed in accordance with the present invention.
Figure 9B:
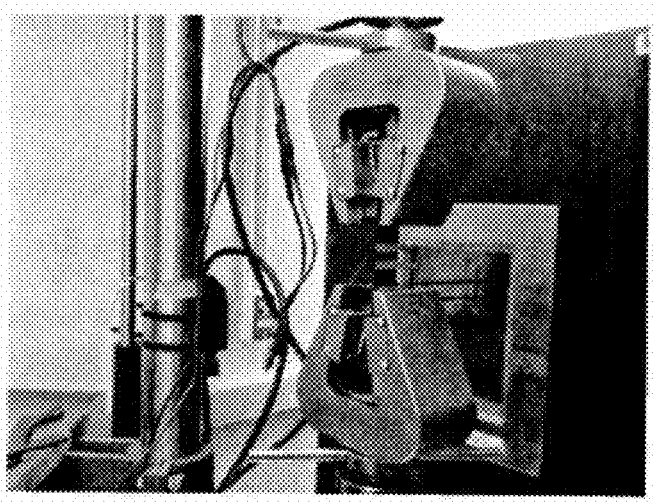
FIG. 9(b) is a photograph of an exemplary sensor formed in accordance with the present invention under tensile loading.
Figure 9C:
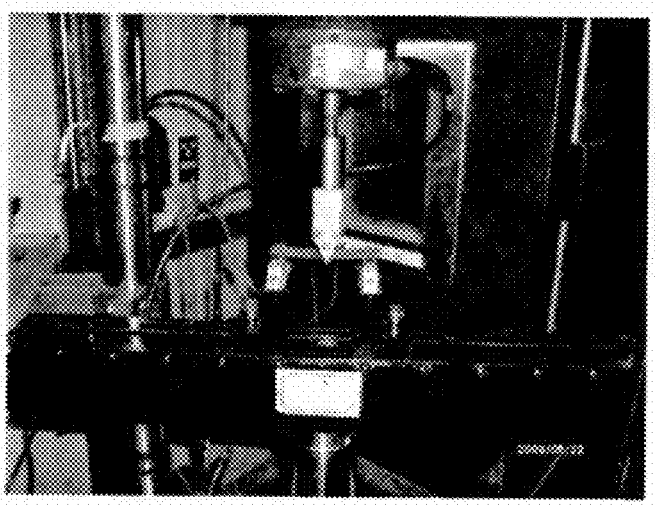
FIG. 9(c) is a photograph of an exemplary sensor formed in accordance with the present invention under flexural loading.

For the sheet resistance measurement of the polymer films formed above, a Mastech digital meter capable of RS232 based PC connectivity was used. This setup may be used to measure resistance using a typical 2 point method, as shown in FIG. 9(a). The digital meter was setup to record and analyze real-time data during mechanical testing of the prepared coupons. FIG. 9(b) and FIG. 9(c) show the composites under tensile and bending loads on MTS 810 system (MTS systems Corporation, Eden Prairie, Minn.) respectively. A loading rate of 1 mm/min was used in both cases. The strain rates were kept lower than recommended by ASTM D790 and ASTM D3039 to avoid any movement of the contact points that may lead to noise in resistance measurement.

The strain gauge was prepared using spray printing on the composites prepared above and TEFLON® plaques. The performance of these gauges was characterized using tensile and flexural loading modes. The strain was kept low (<5%) for the composites, whereas Teflon specimens were loaded to high strains (~50%).

Figure 10A:
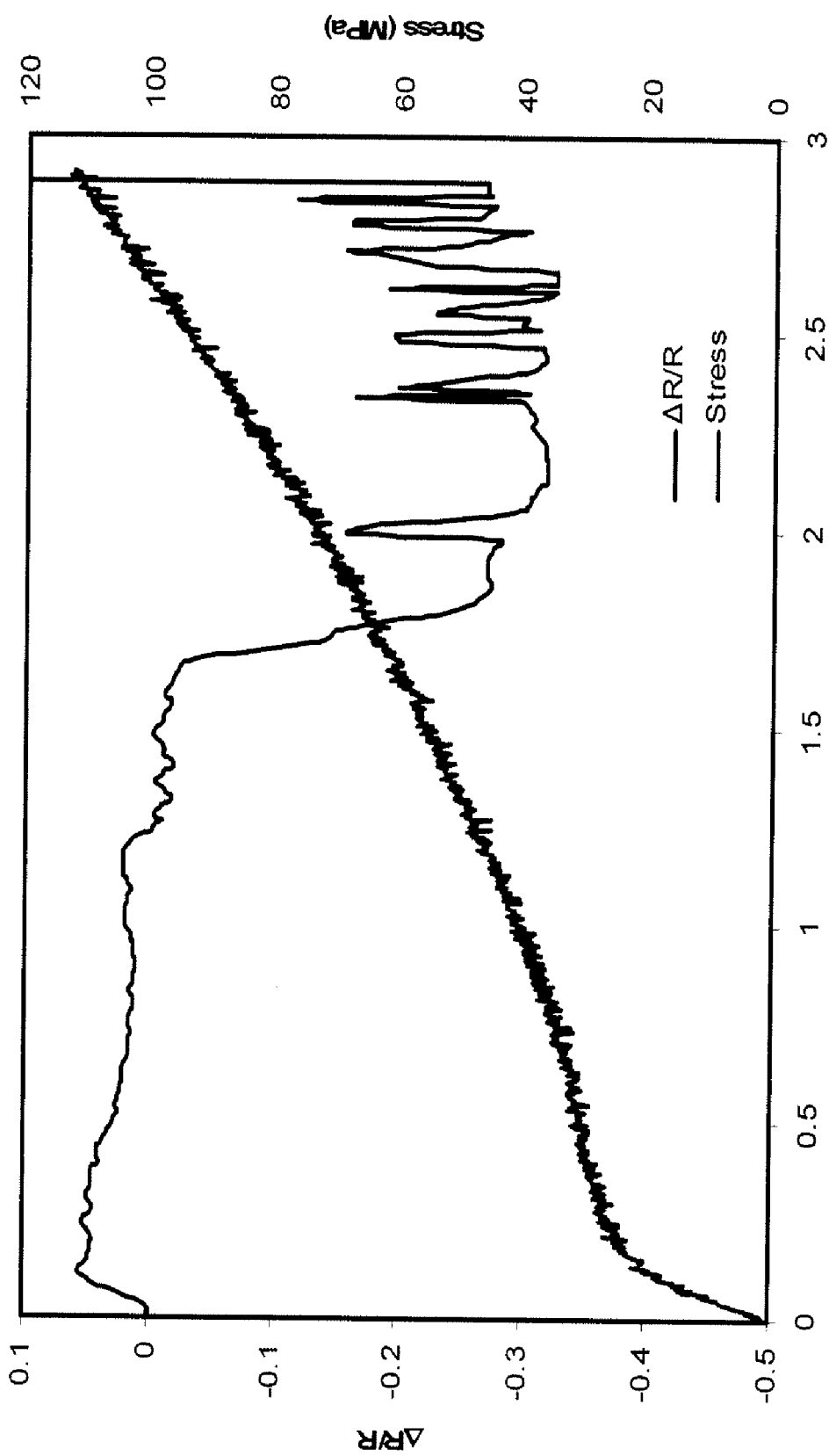
FIG. 10(a) is a graph showing the stress/resistance behavior under tensile loading of an exemplary sensor formed in accordance with the present invention.

The composite coupons were loaded on the MTS in both tensile and flexural modes. FIG. 10(a) shows the stress/resistance behavior observed during the test. The testing was conducted at uniform crosshead displacement rate. The specimen under tensile loading was exposed to a maximum 5% strain whereas the flexural sample was taken to only 1.2% strain. The specimen was held at the peak load in the flexural case to identify the strain gauge behavior.

Figure 10B:
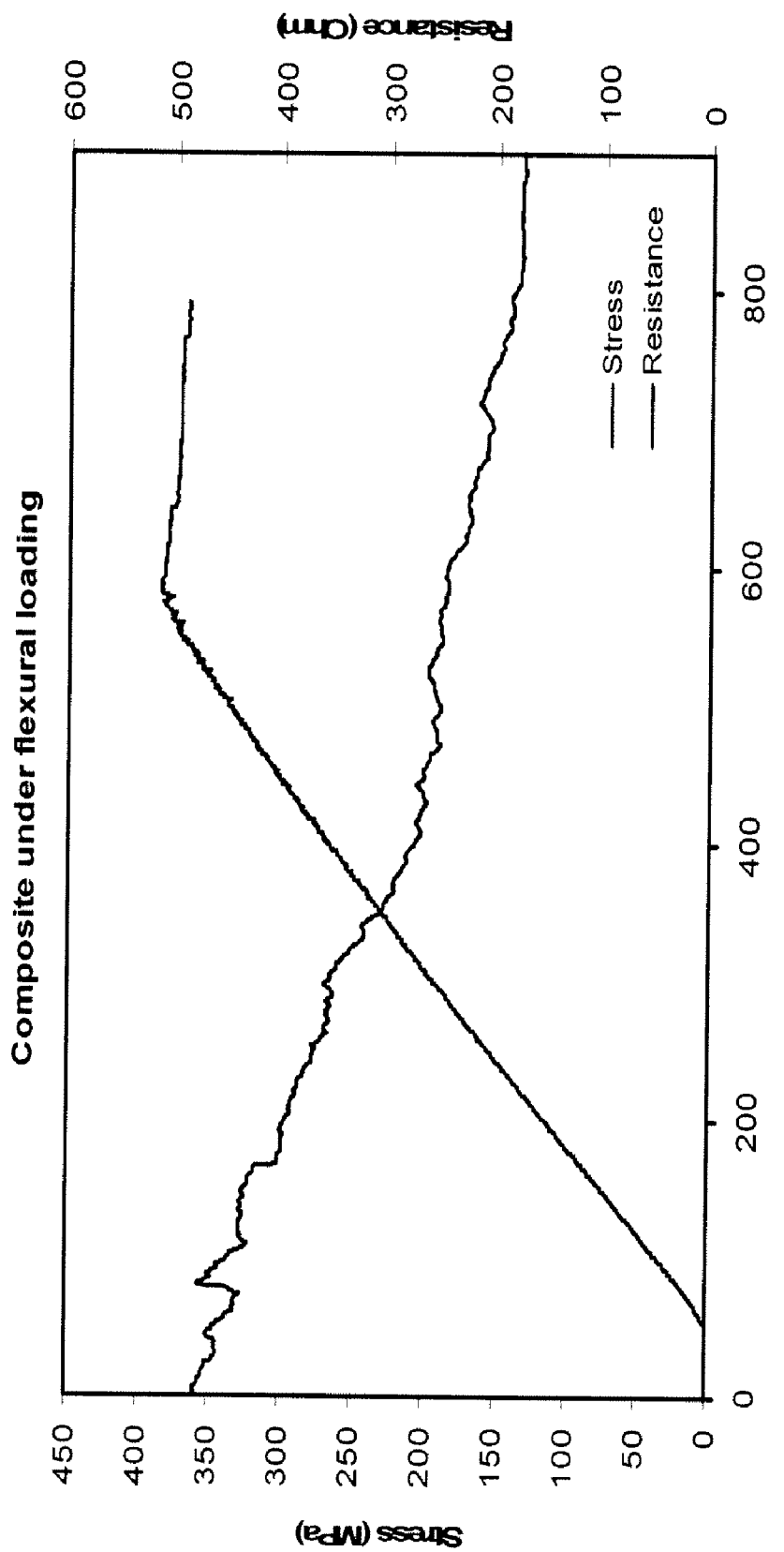
FIG. 10(b) is a graph showing the stress/resistance behavior under flexural loading of an exemplary sensor formed in accordance with the present invention.
Figure 11:
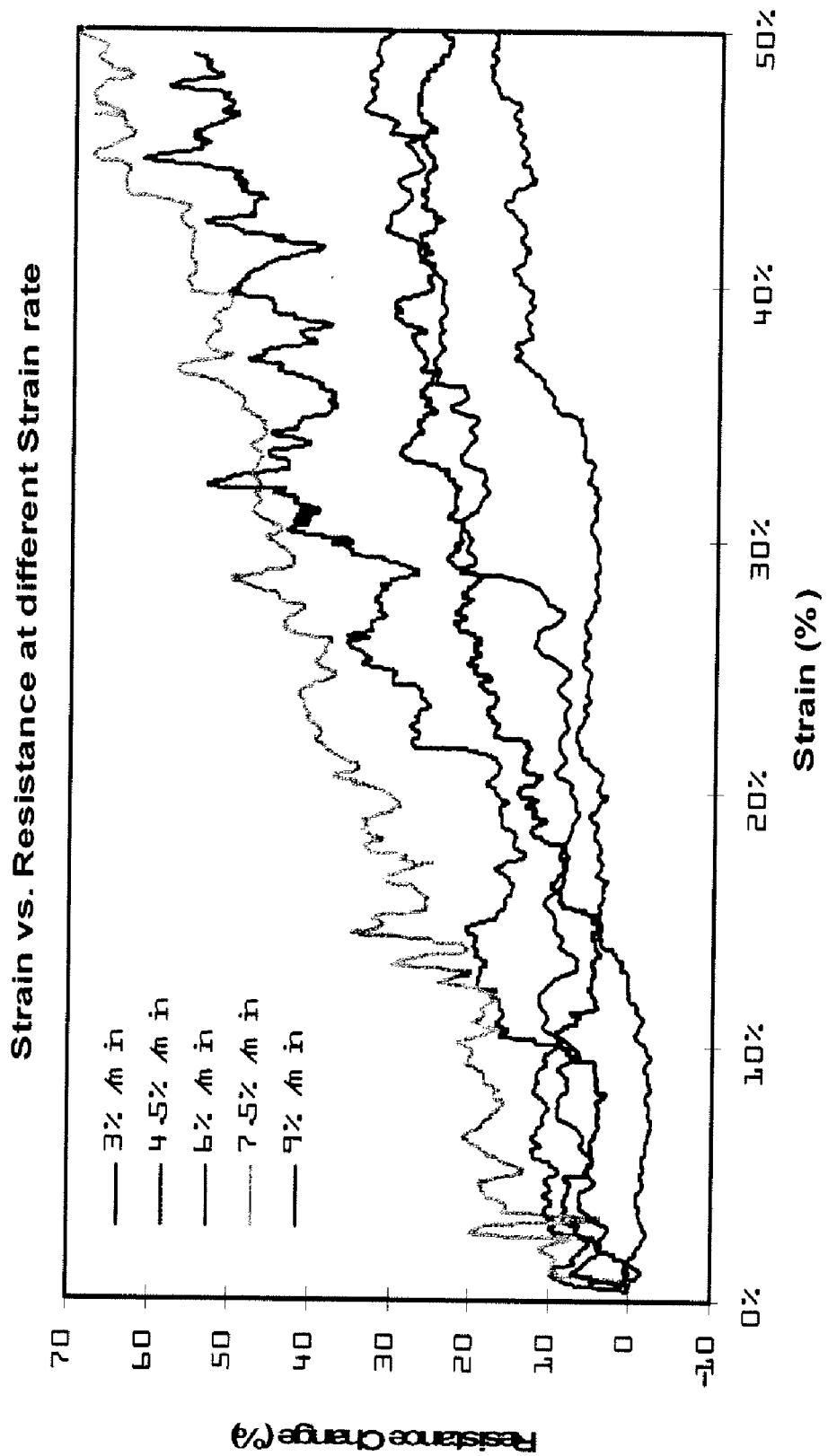
FIG. 11 is graph depicting the sensitivity of an exemplary sensor formed in accordance with the present invention when under tensile loading.

Samples were prepared using TEFLON® sheets for characterizing mechanical behavior of the ICP film with strain. Sheets with nominal dimensions of 150×25.4×1.2 mm$^3$ were cut for tensile testing. Strain gauge and the copper contacts were prepared on the Teflon samples as discussed previously. The TEFLON® specimens were loaded at varying displacement rates. FIG. 10(b) shows the resistance measurement during the tensile loading of TEFLON® specimens. The TEFLON® plaques were loaded at 3, 4.5, 6, 7.5, and 9%/min. strain rate. The result shows an approximate linear trend for the strain, however, different strain rates do not seem to show a conclusive behavior. (FIG. 11)

The mechanical testing of ICP films on the composite and TEFLON® substrates show larger correlation in the case of TEFLON®. Without being bound by theory, it is postulated that since carbon-based composites show inherent conductivity, the resistance measurement of the ICP films are affected. Nonetheless, strain gauges mounted on TEFLON® plaques, which were used as insulator substrates, show a linear correlation with strain. Additionally, the thermal analysis data indicates that the ICP based films may be thermally stable for aerospace applications.

In spite of the current noise in the strain sensing data, the ICP based strain gauges demonstrate promising results.

EXAMPLE 8

This example demonstrates an exemplary method of forming CSA doped polyaniline. 0.05 g of polyaniline-EB were blended with 0.07 g of s-CSA. The blend was ground into a fine powder and then added to 5 mL of m-cresol. This was then sonicated for two hours and stirred for two days. The PANI-CSA was then filtered.

This example demonstrates an exemplary method of forming aminoanthraquinone (AAQ) doped PANI. 0.05 g 1-AAQ were added to 300 mL of 6M sulfuric acid and sonicated until dissolved. The solution was transferred to a reactor and 1.87 g of 13% sodium hypochlorite solution was added. The mixture was stirred for two days and then centrifuged to separate the blue precipitate. The precipitate was washed with methanol until the $SO_4^{2-}$ and $Cl^-$ in the supernatant was converted to silver nitrate and barium chloride. The product was dried at 45° C. in a vacuum oven for 24 hours. The product was characterized by UV-Vis-NIR spectroscopy.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A sensor comprising:
   a substrate having at least one intrinsically conductive polymer coated on at least a first surface thereof; and
   at least a first and second conductive contact in communication with at least one of the intrinsically conductive polymer coating or the substrate, wherein the sensor detects and distinguishes between changes in conductivity and resistance and distinguishes between reversible strain and non-reversible damage.

2. The sensor according to claim 1, wherein the substrate is selected from one or more of plastics, fibers, fabrics, resins, composite materials, metals, concretes, wood and ceramics.

3. The sensor according to claim 2, wherein the composite materials are selected from one or more of carbon-fiber reinforced epoxy, glass-fiber reinforced epoxy, carbon-fiber reinforced BMI, and glass-fiber reinforced polyester.

4. The sensor according to claim 1, wherein the intrinsically conductive polymer is selected from one or more of polyaniline, polypyrrole, polyacetylene, and poly(3,4-ethylenedioxy thiophene).

5. The sensor according to claim 4, wherein the intrinsically conductive polymer is acid-doped.

6. The sensor according to claim 5, wherein the acid doped into the intrinsically conductive polymer is selected from one or more of polystyrene sulfonate, 1-anthracene sulfonic acid, 9-anthracene sulfonic acid, 2-phenanthrene sulfonic acid, 3-phenanthrene sulfonic acid, 9-phenanthrene sulfonic acid, $NO_2CF_3SO_3^-$, $CF_3SO_3H$, perfluro octyl sulfonic acid, perfluoro octyl carboxylic acid, octylsulfonic acid, dodecylsulfonic acid, cetylsulfonic acid, toluenesulfonic acid (TsOH), $Fe(OTs)_3$, $Fe(CH_3SO_3)_3$, $(FSO_3)_2$, $AgOTs$, $CH_3SiOTs$, dodecylbenzene sulfonic acid, naphthalene sulfonic acid, benzene disulfonic acid, benzene sulfonic acid, 1,3-benzene disulfonic acid, 2,5-dihydroxy-1,4-benzene disulfonic acid, camphor sulfonic acid, camphor sulfinic acid, naphthalene trisulfonic acid, dodecylbenzene sulfonic acid, isethionic acid, 1,5-naphthalene disulfonic acid, nickel phthalocyanine tetrasulfonic acid, phenyl phosphonic acid, poly(vinyl sulfonic acid), 3,-sulfopropyl acrylate, 3-sulfopropyl methacrylate, sulfamic acid, 5-sulfosalicylic acid, tiron (4,5-dihydroxy-1,3-benzene sulfonic acid), vinyl sulfonic acid, sulfanilic acid, 4-sulfophthalic acid, sulfoacetic acid, methyl orange, phenylphosphonic acid, dodecylbenzenesulfonic acid, sulfonated polystyrene, sulfonated poly(α-vinyl naphthalene), naphthol yellow, naphthol blue black, 1,2-naphthoquinone-4-sulfonic acid, naphthylazoxine S, 1-octane sulfonic acid, t-butyl phosphonic acid, ethyl phsophonic acid, butyl phosphonic acid, 1,2-benzene disulfonic acid, 4-octylbenzene sulfonic acid, 2-mesitylene sulfonic acid, 2,6-naphthalene disulfonic acid, 2-naphthalene sulfonic acid, 1,3,6-naphthalene trisulfonic acid, 1,3,7-naphthalene trisulfonic acid, sulfonazo III acid, biphenyl disulfonic acid, biphenyl sulfonic acid, 1,8-dihydroxynaphthalene-3,6-disulfonic acid, 3,6-dihydroxynaphthalene-2,7-disulfonic acid, 4,5-dihydroxynaphthalene-2,7-disulfonic acid, 6,7-dihydroxy-2-naphthalene sulfonic acid, 1-naphthalene phosphoric acid, 1-naphthalene sulfonic acid, 1-naphthalene-5,7-dinitro-8-hydroxy, 1-naphthalene-4-hydroxy sulfonic acid, 4-bromo benzene sulfonic acid, 4-hydroxy-5-isopropyl-2-methyl benzene sulfonic acid, 3,4-diamino benzene sulfonic acid, benzene phosphoric acid, 1,3,5-benzene trisulfonic acid, 2-methyl-5-isopropyl benzene sulfonic acid, 3,4-dinitro benzene sulfonic acid, 2-methoxy benzene sulfonic acid, 1-naphthalene-5-hydroxy sulfonic acid, 1-naphthalene 7-hydroxy sulfonic acid, dinonylnaphthalene sulfonic acid, p-toluene sulfonic acid, 1-naphthalene-3-hydroxy sulfonic acid, 2-naphthalene-1-hydroxy sulfonic acid, 4-phenylamino benzene sulfonic acid, and

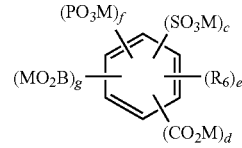

wherein M is a metal or non-metal cation, c is 1,2,3, or 4; d is 0, 1, or 2, f is 0, 1, or 2, g is 0, 1, or 2, e is 0, 1, or 2., and $R^6$ is nitro, cyano, hydroxy, halogen, alkoxy, phosphate, borate, carboxylate, substituted or unsubstituted aryl or alkyl having from 1 to about 30 carbon atoms wherein permissible substituents include perhaloalkyl, phenyl, alkoxy, halogen, cyano, haloalkyl, hydroxy, sulfonic acid, phosphoric acid, boric acid, sulfinate, sulfinic acid, carboxylic acid, nitro, carboxylate and the like, or any two $R^6$ substituents together may form an alkenylene chain completing a fused-ring system which chain may be unsubstituted or substituted with one or more halogen, phosphoric acid, hydroxy, boric acid, nitro, cyano, sulfinate, phosphoric acid, sulfinic acid, phosphate, carboxylate, phosphonic acid, phosphonate, sulfonate, borate, sulfonic acid or carboxylic acid groups, or $R^6$ is a moiety of the formula:

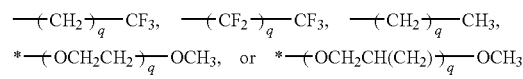

wherein q is a positive whole number from 1 to about 10.

7. The sensor according to claim 1, wherein the first and second contacts are electrodes.

8. The sensor according to claim 1, wherein the first and second contacts are independently selected from one or more of copper, silver, silver/carbon composites, indium-tin-oxide, fluoride-doped tin oxide, fluoride-doped zinc oxide, gallium-doped zinc oxide, aluminum-doped zinc oxide, antimonium-tin oxide, and zinc-tin oxide.

9. The sensor according to claim 1, wherein each of the first and second conductive contacts is adjacent a surface of the at least one intrinsically conductive polymer that is not adjacent the first surface of the substrate.

10. The sensor according to claim 1, wherein each of the first and second conductive contacts is adjacent a surface of the at least one intrinsically conductive polymer that is adjacent the first surface of the substrate.

11. The sensor according to claim 1, wherein one of the first and second contacts is between the substrate and the at least one intrinsically conductive polymer, while the other of the first and second contacts is adjacent a surface of the at least one intrinsically conductive polymer that is not adjacent the first surface of the substrate.

12. The sensor according to claim 1, wherein the substrate is one or both of a piezoelectric material and ferroelectric material.

13. The sensor according to claim 12, comprising a second intrinsically conductive polymer coated on a second surface of the substrate, wherein the second surface is directly opposite the first surface of the substrate.

14. The sensor according to claim 13, wherein the first intrinsically conductive polymer and the second intrinsically conductive polymer are the same.

15. The sensor according to claim 13, wherein the first intrinsically conductive polymer and the second intrinsically conductive polymer are different.

16. A method of fabricating a sensor, the method comprising:

depositing on a first surface of a substrate at least one intrinsically conductive polymer; and depositing a first and second contact in communication with at least one of the intrinsically conductive polymer coating or the substrate, such that the sensor detects and distinguishes between changes in conductivity and resistance in the coating and distinguishes between reversible strain and irreversible damage.

17. A method of sensing damage in a composite material, the method comprising:

incorporating a sensor into or onto the composite, the sensor comprising:

a substrate having at least one intrinsically conductive polymer coated on at least a first surface thereof; and at least a first and second conductive contact in communication with at least one of the intrinsically conductive polymer coating or the substrate; and detecting and distinguishing between changes in the conductivity and resistance of the intrinsically conductive polymer over time and distinguishing between reversible strain and irreversible damage.

18. The method according to claim 17, wherein the sensor is on a surface of the composite.

19. The method according to claim 17, wherein the sensor is embedded into the composite.

20. A composite material comprising a sensor, wherein the sensor includes:

a substrate having at least one intrinsically conductive polymer coated on at least a first surface thereof; and at least a first and second conductive contact in communication with at least one of the intrinsically conductive polymer coating or the substrate, wherein the sensor detects and distinguishes between changes in conductivity and resistance and distinguishes between reversible strain and non-reversible damage.

* * * * *